(12) United States Patent
Glynn

(10) Patent No.: US 6,721,482 B1
(45) Date of Patent: Apr. 13, 2004

(54) TELECOMMUNICATIONS FIBER OPTIC INFRASTRUCTURE

(76) Inventor: Thomas A. Glynn, 111 86th St., Brooklyn, NY (US) 11209-4913

( * ) Notice: Subject to any disclaimer, the term of this patent is extended or adjusted under 35 U.S.C. 154(b) by 0 days.

(21) Appl. No.: 09/151,115

(22) Filed: Sep. 10, 1998

(51) Int. Cl.[7] .................................................. G02B 6/46
(52) U.S. Cl. ...................................................... 385/135
(58) Field of Search ................................. 385/134–139

(56) References Cited

U.S. PATENT DOCUMENTS

| | | | | |
|---|---|---|---|---|
| 4,502,754 A | * | 3/1985 | Kawa | 385/134 |
| 4,630,886 A | * | 12/1986 | Lauriello et al. | 385/135 |
| 4,818,054 A | * | 4/1989 | George et al. | 385/135 |
| 5,129,030 A | * | 7/1992 | Petrunia | 385/135 |
| 5,353,367 A | * | 10/1994 | Czosnowski et al. | 385/134 |
| 5,402,515 A | * | 3/1995 | Vidacovich et al. | 385/135 |
| 5,420,958 A | * | 5/1995 | Henson et al. | 385/135 |
| 5,490,229 A | * | 2/1996 | Ghandeharizadeh et al. | 385/135 |
| 5,497,444 A | * | 3/1996 | Wheeler | 385/134 |
| 5,530,954 A | * | 6/1996 | Larson et al. | 385/135 |
| 5,546,485 A | | 8/1996 | Darcie | 385/28 |
| 5,689,604 A | * | 11/1997 | Janus et al. | 385/134 |
| 5,701,380 A | * | 12/1997 | Larson et al. | 385/134 |
| 5,724,468 A | * | 3/1998 | Leone et al. | 385/134 |
| 5,784,516 A | * | 7/1998 | Parzygnat et al. | 385/134 |
| 5,960,130 A | * | 9/1999 | Pimpinella | 385/15 |
| 5,987,203 A | * | 11/1999 | Abel et al. | 385/134 |
| 6,055,343 A | * | 4/2000 | Pimpinella | 385/16 |
| 6,061,492 A | * | 5/2000 | Strause et al. | 385/134 |
| 6,160,946 A | * | 12/2000 | Thompson et al. | 385/134 |
| 6,323,993 B1 | | 11/2001 | Hansen et al. | 359/337 |
| RE37,489 E | * | 1/2002 | Anton et al. | 385/135 |

FOREIGN PATENT DOCUMENTS

| | | | | |
|---|---|---|---|---|
| DE | 4301421 A1 | * | 7/1994 | G02B/6/36 |
| WO | WO 90/10884 | * | 9/1990 | G02B/6/28 |

* cited by examiner

Primary Examiner—Akm Enayet Ullah
Assistant Examiner—Michelle R. Connelly-Cushwa
(74) Attorney, Agent, or Firm—Kenyon & Kenyon

(57) ABSTRACT

Proposed is an apparatus and process (collectively referred to as a "Fiber Center") for deploying and managing a central office fiber optic telecommunications infrastructure in response to demand from either a customer location or another operating telephone company (OTC) location. Customer demand information and management parameters are entered into a software system. In response to the demand information, the software system describes the required standard components and prefabricated cables, assigns the standard components and prefabricated cables to a specific location and enters this information into a reference data base. Assembly of the fiber optic infrastructure is implemented according to an equipment order which is generated based on the description and location information in the reference data base.

20 Claims, 27 Drawing Sheets

TELECOMMUNICATIONS FIBER OPTIC INFRASTRUCTURE

FIELD OF INVENTION

The present invention relates generally to telecommunications fiber optic infrastructures. More particularly, the present invention relates to an apparatus and process for deploying and managing a central office fiber optic infrastructure in response to demand from either a customer location or other Operating Telephone Company (OTC) location.

BACKGROUND INFORMATION

Telecommunications central office infrastructure is deployed in response to perceived or forecasted customer demand. The central office infrastructure includes a Fiber Distributing Frame (FDF), numerous central office equipments mounted in equipment bays which are arranged in rows known as equipment lineups, and cables which connect the central office equipments to outside plant (OSP) cable facilities via the FDF.

In most modern telephone central offices, the rows of equipment lineups are placed parallel to the FDF. An overhead cable rack (sufficient in length to extend from the FDF to the equipment lineup most distant from the FDF) is typically placed on one or both sides of and perpendicular to the FDF and equipment lineups. The cable rack provides a path for cables connecting between the FDF and equipment bay lineups in the central office. The cable racks provided for these cables can vary between central offices based on specific site constraints.

Once the initial deployment of central office infrastructure is in place, customer locations are connected to particular equipments within the central office. First, outside plant (OSP) cable from the customer locations is terminated on the FDF. The specific location where an OSP cable connects to the FDF is known as a facility termination.

Equipments are physically installed in equipment bays which are positioned in rows known as equipment lineups. The majority of central office equipments are deployed in bulk amounts on an annual basis in response to forecasted demand. Other equipments are deployed as a direct result of specific customer requirements. Cable from these central office equipments in the equipment lineups runs along the cable rack to particular locations on the FDF which are known as equipment terminations. A cross connect jumper is then run from a particular assigned equipment termination to a particular assigned facility termination on the FDF. This cross connect jumper is usually dual fiber and provides an optical connection as needed to service a particular customer location. Cable paths between equipment terminations on the FDF and the central office equipments in the equipment lineups are developed according to the peculiarities of each particular central office location.

Central office equipments are deployed with connectors mounted on the back plate of the equipment. These connectors facilitate connecting an equipment cable between the equipment and the FDF. Because the length of the equipment cable varies depending on the location of the equipment in the equipment lineups, a custom length cable must be measured for each equipment or group of equipments and connector assemblies must be fusion spliced to one end of the cable for connection to the connectors on the equipment back plate. If the connectors are improperly spliced to the equipment cable, the signal may be lost at the connection. Deploying on site fabricated equipment cables and splicing connectors to the cable is time consuming, costly and inefficient.

Generally, the Operating Telephone Company (OTC) deploys OSP cable and central office equipments on an independent basis using separate work orders. These separate work orders result in facility and equipment terminations which are randomly located on the FDF with no regard to insuring proximity between terminations which will be connected with a cross connect jumper. Thus, cross connect jumpers on the FDF can vary widely in length and require ordering, stocking or on site fabrication prior to placement on the FDF. These methods of supplying cross connect jumpers are disadvantageous for reasons including the following: 1) rapid deployment of new services to the customer is impeded because supplying the jumpers can take from one day to two weeks, 2) fusion spliced connectors are required for each jumper, and 3) custom length jumpers are costly. In addition, the use of a cross connect jumper as an intermediate connection between the outside plant cables and the equipment cables is inefficient and requires two connection points which results in unnecessary signal loss.

The current central office infrastructure deployment methods do not provide a fail-safe provision for positive verification of the deployment of central office equipments or their corresponding equipment terminations on the FDF. In most cases, the information included in the work order is entered into a data base. However, variables such as unverified work, omissions, and transcript errors result in a data base which can be far less than 100% accurate.

Current methods for the deployment of equipment bays in the central office are best described as random. Equipment bays are deployed in the next available space and access the FDF over a common cable rack at the end of the equipment lineup. When a particular lineup of equipment bays can no longer be grown due to structural constraints or the local fire codes, a new lineup of equipment bays is started and run parallel to the first.

The new equipment lineup accesses the FDF over an extension to the common cable rack at the end of the existing equipment lineup. When a particular cable rack reaches capacity, another route to the FDF is designed and a new cable rack is deployed. The same can be said for the methods for the deployment of equipment cable on the FDF. When new equipment is deployed, the corresponding equipment cable is terminated on the next available shelf or shelves on the FDF. The method of terminating OSP cables on the FDF is much the same, in that a new OSP cable is usually terminated on the next available shelves. Both Equipment terminations and OSP terminations are deployed on the FDF in a manner that is best described as random. There is no basic organization and as a result all connections on the FDF are accomplished using cross connects.

Cable management in the majority of central offices which deploy equipment lineups in parallel to the FDF is inefficient. In these central offices, cable routes must run from a particular equipment in a direction parallel to the equipment lineups until reaching the cross aisle (workplace safety concerns weigh against running cables directly from a central office equipment on a fiber pathway above and perpendicular to the equipment lineups toward the FDF because workers would be required to use ladders or other equipment to raise cables above the equipment lineups). Once at the cross aisle cable rack, cables are run towards the FDF where they must turn and run parallel to the FDF to access a particular equipment termination on the FDF.

Cables in the cable rack are randomly stacked one upon another over the years of operation of the central office. When a central office equipment is retired or replaced, the cable(s) which connected this particular equipment to the FDF is cut and left in place in the cable rack. Because equipment retirement usually takes place approximately 10 years after a cable is initially installed, the cable is usually buried beneath a 10 year accumulation of other cables in the cable rack. The inability to identify specific cables within the cable rack makes actual removal of the particular cable extremely burdensome. The OTC's inability to identify specific cables within the cable rack means the cables cannot be reused to connect replacement equipment. As a result, cables are usually used for only 10 of their approximately 25 years of useful life. When a replacement or new equipment is deployed in the equipment lineups, a new cable must be deployed and placed on top of the stack of cables in the cable rack to connect this new equipment to the FDF. Thus, over a period of years, the cable rack essentially consists of unused cut cables on the bottom of the cable rack and new cables accumulating on the top. Once the height of the cables in the rack begins to exceed the rack capacity, cables on the bottom of the rack are mined. Mining entails using a variety of cutting and removal tools or similar equipment to cut and remove cables which may have been in place for 10 or more years. Because the line between active and dead cable in the cable rack is unknown to the OTC, the mining operation often results in service interruption to some customers as live cables are accidentally cut and removed.

In view of the foregoing, it can be appreciated that a substantial need exists for an apparatus and process which addresses the above-discussed problems.

SUMMARY OF THE INVENTION

The present invention relates to deploying and managing a telecommunications fiber optic infrastructure. The basic infrastructure comprises a fiber center distributing frame, customer equipment (such as telephones) connected to the fiber center distributing frame, and central office equipment (installed in equipment bays) connected to the fiber center distributing frame. The standard components required to deploy and manage the infrastructure are determined by entering customer demand information into a software system. In response the customer demand information, the software system describes the required standard components and prefabricated cables, assigns the standard components and prefabricated cables to their specific locations and enters this information into a reference data base.

DETAILED DESCRIPTION

The present invention comprises an apparatus and a process (collectively referred to in this document as the "Fiber Center") for deploying and managing a fiber optic infrastructure in response to demand from either a customer location or another Operating Telephone Company (OTC) location. This detailed description will first compare an example of a typical central office infrastructure floor plan with an example of a fiber center floor plan using standardized components according to an embodiment of the present invention. Following this comparison, examples of the individual standardized components of the fiber center fiber optic infrastructure will be described in greater detail. Finally, a process for deploying and managing a fiber optic infrastructure in accordance with an embodiment of the invention will be described.

Figure 1:
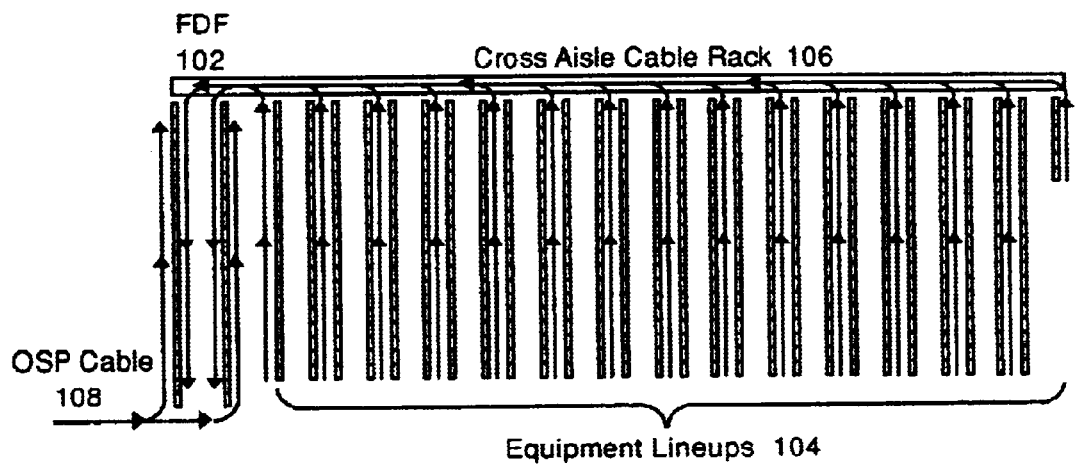
FIG. 1 illustrates a typical central office floor plan.

FIG. 1 illustrates a typical central office floor plan. Two fiber distributing frames (FDF) 102 are positioned on the far left side of FIG. 1. Equipment lineups 104 are placed in rows parallel to the FDF 102. Each one of the equipment lineups 104 consist of a series of connected equipment bays. Central office equipment is mounted in the equipment bays. Cable racks 106 are positioned perpendicular to the FDF 102 and the equipment bay lineups 104.

As indicated by the arrows in FIG. 1, a cable (not shown) from a particular central office equipment in the equipment bay lineups 104 runs parallel to the equipment bay lineup 104 until reaching the cable rack 106. Upon reaching the cable rack 106, the cable runs in a direction towards the FDF 102. Near the FDF 102, the cable again runs in a parallel direction until reaching an equipment termination point on the FDF 102. OSP cables 108, also represented by arrows, run from a particular customer location and terminate on the FDF 102 at a location known as a facility termination. To complete a connection between the particular customer location and a central office equipment in the equipment bay lineups 104, a cross connect jumper (not shown) is connected from the facility termination to the equipment termination on the FDF 102.

Figure 2:
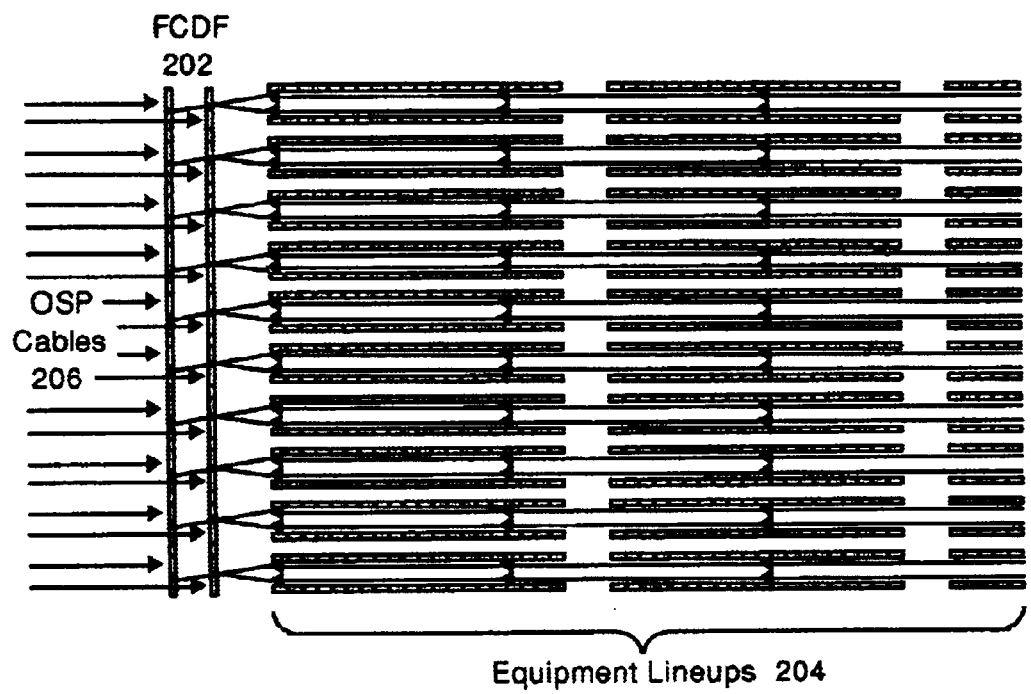
FIG. 2 illustrates an example of a Fiber Center floor plan in accordance with one embodiment of the present invention.

FIG. 2 illustrates an example of a Fiber Center floor plan in accordance with one embodiment of the present invention. Two Fiber Center Distributing Frames (FCDF) 202 (discussed in greater detail below), are positioned on the far left side of FIG. 2. In contrast to the equipment lineups 104 in FIG. 1, the equipment lineups 204 are positioned in parallel rows substantially perpendicular to the FCDF 202. Equipment lineups 204 consist of a series of connected standard equipment bays (described in greater detail below).

OSP cables 206 run from a customer location or other central office and terminate on the FCDF 202. This termination point is known as a facility termination.

The arrows between the parallel rows of the equipment lineups 204 indicate the direction prefabricated equipment cables are run from individual central office equipments in the equipment lineups 204 to the FCDF 202. In contrast to the use of the cable rack 106 in FIG. 1, this embodiment entails deploying equipment cables along an overhead cable pathway (not shown). Connecting a customer location to a particular central office equipment in this embodiment is similar to the connection described with reference to FIG. 1. However, in this embodiment, cross connect jumpers are significantly reduced by proximately locating related facility and equipment terminations on the FCDF 202 (this process, known as "grooming", will be discussed in greater detail below).

Figure 3:
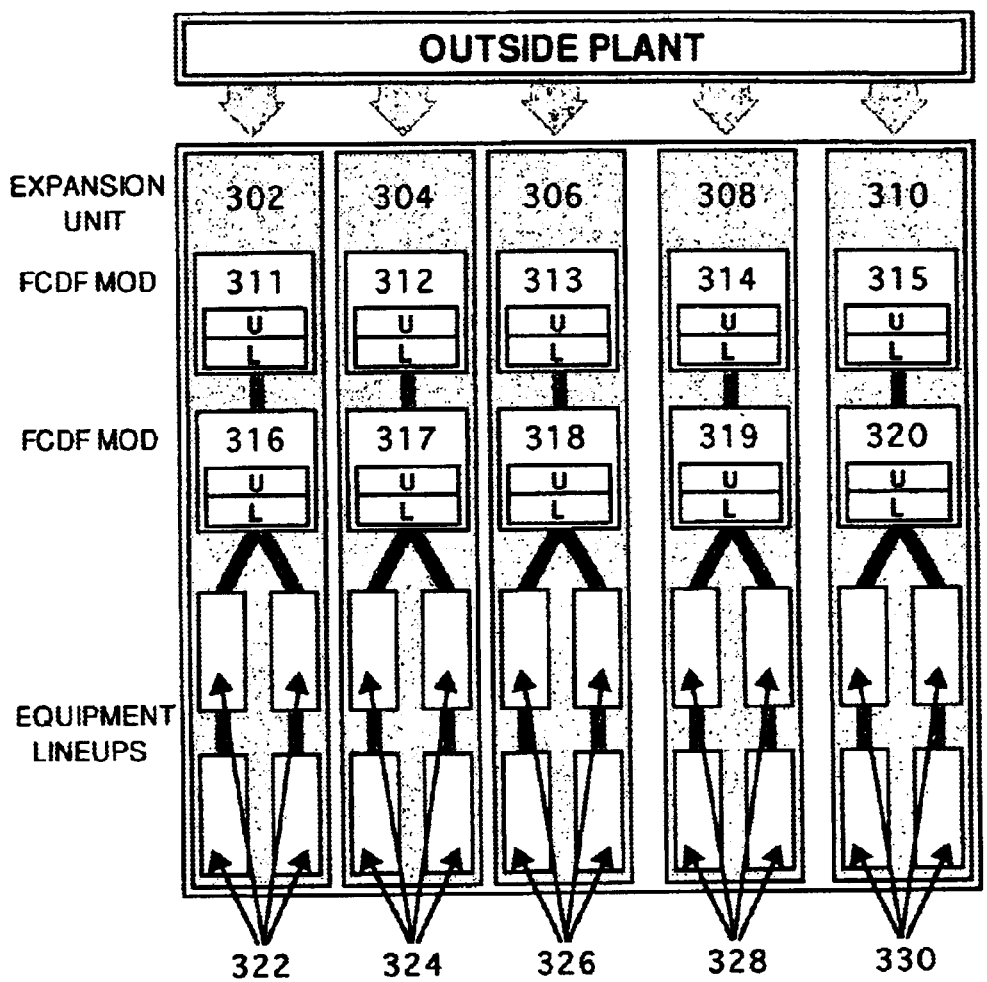
FIG. 3 illustrates a more detailed overhead view of a portion of the FIG. 2 floor plan divided into a series of Expansion Units in accordance with one embodiment of the present invention.

A more detailed description of the standardized components of the Fiber Center floor plan of FIG. 2 begins with the Fiber Center Expansion Unit. The Fiber Center Expansion Unit is the basic building block for the Fiber Center infrastructure of the present invention. The Fiber Center infrastructure of FIG. 2 consists of a series of Expansion Units. FIG. 3 illustrates a more detailed overhead view of a portion of the FIG. 2 floor plan divided into a series of Expansion Units in accordance with the present invention. Each of the five Expansion Units 302, 304, 306, 308 and 310 consist of a pair of facing FCDF modules (mods) 311-320 and a pair of equipment lineups 322, 324, 326, 328 and 330. The FCDF mods are a specific type of FDF which will be described in greater detail below. The arrows from the block labeled "Outside Plant" in FIG. 3 represent cables from customer locations which terminate on one of the FCDF mods 311–320.

Equipment lineups 322, 324, 326, 328 and 330 consist of a series of standardized equipment bays. Each standardized equipment bay (described in greater detail below) includes a number of central office equipment mounting positions on which central office equipment is placed. The equipment lineups are of sufficient length to accommodate the number of central office equipments needed to support the OSP facilities whose cables terminate on the FCDF mod(s) in the corresponding Expansion Unit. In the preferred embodiment of a fiber optic infrastructure in accordance with the present invention, a pair of equipment lineups supports one FCDF mod or two facing FCDF mods.

Figure 4:
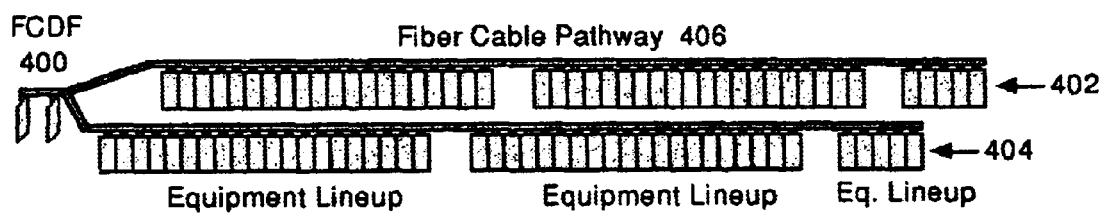
FIG. 4 illustrates a side view of an Expansion Unit in accordance with one embodiment of the present invention.

FIG. 4 illustrates a side view of an Expansion Unit in accordance with one embodiment of the present invention. In FIG. 4, a pair of two facing FCDF mods 400 are connected to a pair of equipment lineups 402 and 404 via a fiber cable pathway 406 (described in greater detail below). As mentioned previously, the equipment lineups 402 and 404 consist of a series of standardized equipment bays. Cables which connect central office equipments to the equipment termination points on the FCDF mod(s) 400 run along the fiber pathway 406.

Two facing FCDF mods may be supported by two equipment lineups of approximately forty-five equipment bays each as illustrated in FIG. 4. Demand for equipment replacement may be served by the deployment of new stand alone equipment to replace existing equipment or the deployment of optical/digital switch technology to replace existing stand alone or switch equipment. When stand alone equipment demand occurs, the equipment lineup(s) may be extended and the equipment bays equipped (i.e., provided with equipments). The Fiber Center response to switch technology demand may be the extension of the fiber cable pathways to a separate floor location for switch equipment. From an equipped span perspective, the Fiber Center Expansion Unit is a self contained FDF with the equipment support capability to accommodate growth, upgrade and replacement requirements.

Figure 5:
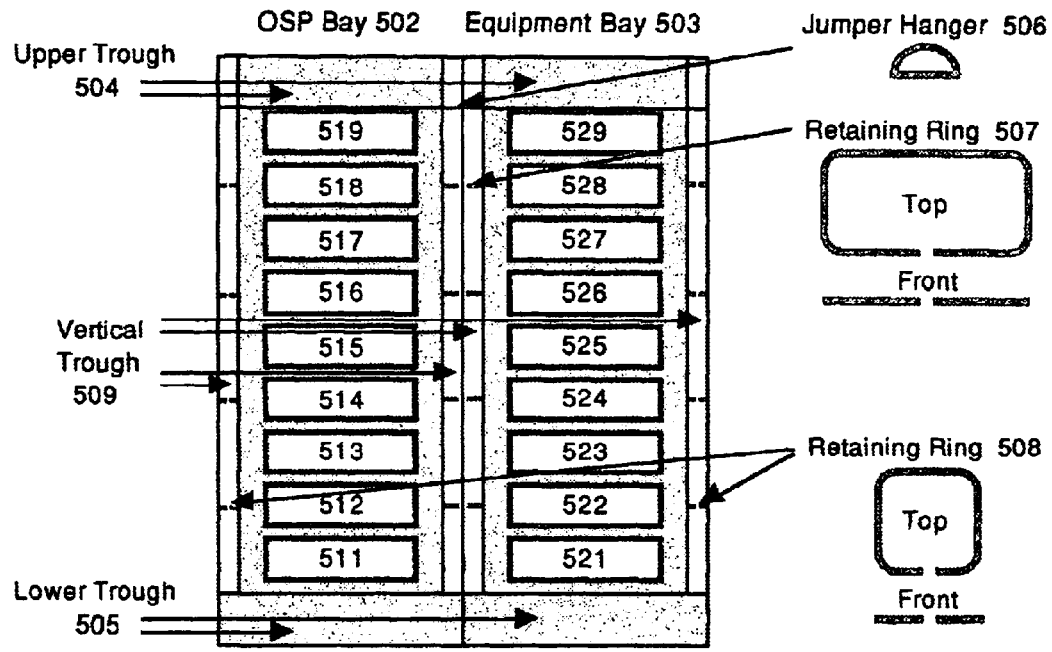
FIG. 5 illustrates a typical example of a Fiber Distributing Frame (FDF) as it may be applied today.
Figure 6:
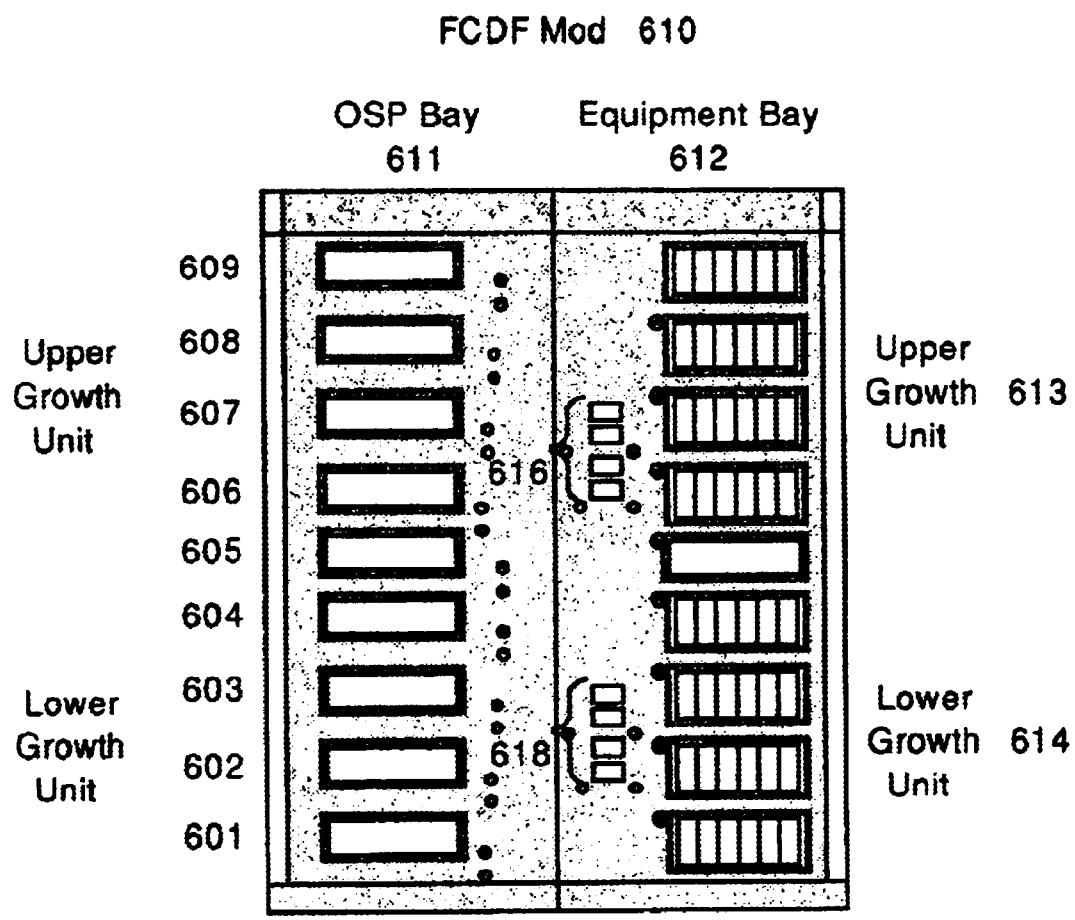
FIG. 6 illustrates an example of two Growth Units within a Fiber Center Distributing Frame module (FCDF mod) in accordance with one embodiment of the present invention.

FIG. 5 illustrates a typical fiber distributing frame (FDF) 501 as it may be found in a central office today. FDF 501 comprises an OSP bay 502 and a central office equipment bay 503 onto which OSP cable and central office equipments are terminated respectively. OSP bay 502 comprises nine shelves numbered 511–519. Equipment bay 503 comprises shelves 521–529. Both OSP bay 502 and Equipment bay 503 are equipped with an upper horizontal trough 504 and a lower horizontal trough 505 for routing cross connect jumpers over a distance of more than one bay. Both OSP bay 502 and equipment bay 503 are equipped with a vertical trough 509 on either side to route cross connect jumpers to or from either the upper or lower horizontal trough. A retaining ring 508 is positioned in the vertical trough on the outside of the end bay in a FDF lineup and is used to route and organize the fiber cross connect jumpers that are run in the troughs. When FDF bays are added the retaining ring 508 is replaced by a retaining ring 507 which is twice the width and is placed across the vertical troughs of two adjacent FDF bays. A jumper hanger 506 is placed at the top of the vertical troughs of each pair of FDF bays to allow excess cross connect jumper slack to be draped and stored. In the preferred Fiber Center embodiment, each Expansion Unit (as illustrated in FIG. 3) may contain up to four Growth Units (two Growth Units per FCDF mod). A Growth Unit is an area on the FCDF mod where both OSP and inside plant (equipment) cables are terminated. FIG. 6 illustrates an example of two Growth Units within a FCDF mod in accordance with one embodiment of the present invention. Horizontally, the FCDF mod 610 comprises an OSP side 611 and an equipment (inside plant) side 612. Vertically, the FCDF mod 610 consists of 9 shelves 601 609. Lower Growth Unit 614 of FCDF mod 610 comprises shelves 601–604. Upper Growth Unit 613 on FCDF mod 610 comprises shelves 606–609. FCDF mod 610 also includes two groups of four rectangular shaped equipment cable ports 616 and 618. Equipment cable ports 616 and 618 provide a structure through which prefabricated equipment cables are deployed prior to terminating the prefabricated cables on a FCDF mod.

As mentioned above, each Expansion Unit contains up to four Growth Units. In the preferred embodiment, a Growth Unit consists of four consecutive OSP shelves on the FCDF mod and the adjacent four consecutive inside plant shelves within the same FCDF mod. The close proximity of the OSP and inside plant shelves enables all equipped span configurations within a particular Growth Unit to be interconnected (as described below). A span is defined as the transmission path between a remote equipment at a customer location (such as a telephone) and a central office equipment.

In the preferred Fiber Center embodiment, All OSP (facility) and inside plant (equipment) terminations within a Growth Unit are linked in a data base as a common group (the data base will be described in greater detail below). In the preferred embodiment, any equipment within the Growth Unit can be assigned to any OSP termination within the same Growth Unit. In the preferred embodiment, the length of an equipment cable jumper (described in detail below) for a prefabricated equipment cable terminating at a location within a Growth Unit is that which allows the jumper to connect to any termination in the four shelves of the Growth Unit and the middle shelf between the upper and lower growth units. This middle shelf (shelf 605 in FIG. 6) is used when transitioning from existing FDF configurations. During the transition, OSP cables are temporarily terminated on shelf 605 to provide interconnection for the existing OSP facilities during the transition. Thus, shelf 605 provides a simplified standard arrangement for the utilization of existing OSP facilities while these facilities are being upgraded and/or reterminated.

Using the preferred embodiment, the OTC may terminate 72 spans within a Growth Unit. These 72 spans may connect to the Growth Unit from an OSP geography served by connection configurations known as "point to point" or "ring" spans. These configurations will be described below. The preferred embodiment also permits the OTC to deploy the infrastructure using a mixture of these configurations. The Growth Unit facilitates the preferential association of 72 OSP fiber spans and up to 144 equipments. As discussed in greater detail below, this preferential association results in a preferred Growth Unit shelf termination ratio of less than 1 to 1. Managing the Growth Unit is provided by the "grooming and linking" of the equipment terminations to the OSP terminations (grooming and linking are discussed in greater detail below).

In the preferred embodiment, each FCDF mod including two Growth Units may terminate 576 fibers, which equates to 144 fiber spans. Thus, an initial Fiber Center consisting of three FCDF mods with the necessary supporting equipment lineups, has the capacity to terminate and equip 144 spans in each of the mods for a total capacity of 432 fiber spans. A Fiber Center configuration may grow to 10 Expansion Units (which consists of up to 20 FCDF mods (two 10 mod lineups facing each other) and the attendant equipment lineups) with the capacity to terminate and equip 288 spans in each for a total capacity of 2880 spans. Should the ultimate demand require a larger number of spans to be equipped, a second, third or fourth configuration can be added to and integrated with that which has been previously deployed so long as the necessary floor space is available.

Referring to FIG. 2, central office equipments in equipment lineups 204 are connected to FCDF 202 via prefabricated equipment cables (not shown in FIG. 2; described below). In the preferred embodiment, the prefabricated equipment cables terminate within the FCDF mod Growth Units. These equipment terminations will now be discussed in greater detail.

Figure 7:
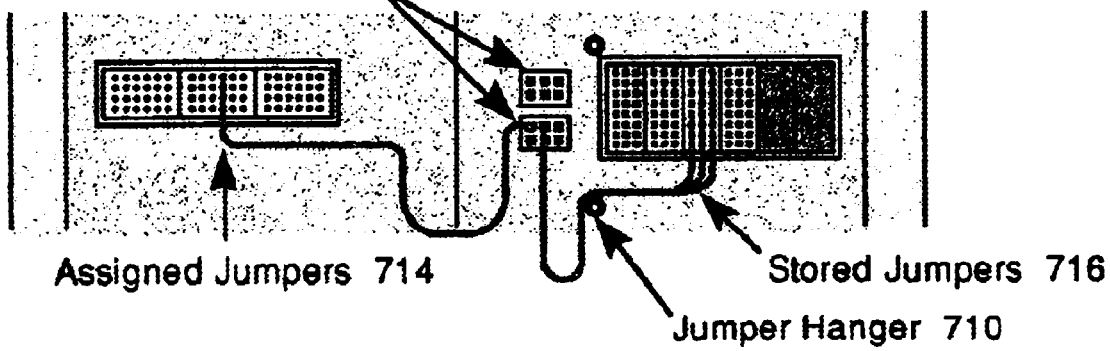
FIG. 7 illustrates an example of an equipment termination interconnected to particular OSP terminations within a Growth Unit in accordance with one embodiment of the present invention.

FIG. 7 illustrates an example of an equipment termination interconnected to corresponding OSP terminations within the Growth Unit in accordance with one embodiment of the present invention. As mentioned above, with reference to FIG. 6, a Growth Unit consists of four consecutive FCDF mod shelves. The Growth Unit shelf of FIG. 7 comprises an OSP side 702, an inside plant side 704, and two equipment cable ports 706 and 708.

Assigned jumpers 714 and stored jumpers 716 are connected to a central office equipment in a equipment lineup (not shown) via a prefabricated equipment cable and a connector extension (both are discussed in greater detail below). Jumper hanger 710 provides a structure on which to hang slack from stored jumpers.

The first step toward arriving at the termination configuration illustrated in FIG. 7 entails placing and anchoring the prefabricated equipment cable (to which the assigned jumpers 714 and the stored jumpers 716 are spliced) in the equipment cable port 708. All jumpers spliced to the prefabricated equipment cable may be initially stored on the inside plant side 704 of the Growth Unit and eventually assigned and moved to the adjacent OSP side 702 of the same Growth Unit. Once the prefabricated equipment cable jumpers are moved to the OSP side 702, the central office equipment may be interconnected to an OSP cable which terminates in the same Growth Unit. Interconnection eliminates the current need for a cross connect jumper.

After connecting one or more jumpers on the OSP side, one or more jumpers from the same prefabricated equipment cable may be stored on the inside plant side 704 of the Growth Unit. Thus, FIG. 7 illustrates a point in time after the central office equipment connected to jumpers 714 has been assigned to a particular OSP cable. Stored jumpers 716 will be used to facilitate future interconnection of central office equipments to other OSP cable terminations within the same Growth Unit.

As mentioned previously, in the preferred embodiment, equipment cables from equipment lineups terminate on FCDF mods which are within the same Expansion Unit as the equipment lineups. In the Fiber Center, the OSP and inside plant fiber cables are viewed as if they were one. The two cables are terminated as close to each other as possible, on adjacent inside plant and OSP sides of the FCDF mod Growth Unit. Grooming is the termination of supporting inside plant cables adjacent to and in response to OSP cable termination. When the OSP fiber cable is deployed from the customer or other location, equipment will be required to provide service for that location. By deploying the equipment terminations within close proximity to the OSP terminations, the OSP and the inside plant sides of the infrastructure (defined as all the fiber cable from the customer connectors through the FCDF to the equipment bay connectors) are positioned for optimum assignment.

Linking associates prefabricated equipment cable with the OSP cable that triggered deployment of that prefabricated equipment cable. This relationship will be selected when demand to equip the physical infrastructure materializes. The linked equipment cable indicates where to equip the physical fiber cable infrastructure.

The concept of grooming and linking is one that is focused on achieving interconnect rather than cross connect when assembling an equipped optical span. When demand requires the assembly of a non-equipped optical span, the OSP fiber terminations are predetermined and because of this, may be cross connected. The present invention is configured to support cross connection of non-equipped spans. As a result of grooming, the OSP (facility) and equipment terminations on the FCDF are located within such close proximity that they can be interconnected rather than cross connected, thereby eliminating the cross connect jumper and one connection point, which, in effect, eliminates one potential trouble point. In addition, the elimination of this connection point reduces the signal loss between the customer location and the central office equipment. FIG. 7 illustrates an example of a point to point configuration interconnected on the FCDF. The present invention also supports ring configuration interconnection on the FCDF. The concept of grooming demands that sufficient equipment termination space be available in the Growth Unit to provide full equipment support for the adjacent OSP cables terminated in that Growth Unit. This suggests something other than a 1:1 OSP to equipment (inside plant) termination ratio when the various support functions the equipment will be required to perform are considered. Examples of these support functions include the following: span assembly, disassembly, facility change, equipment change Switch introduction and replacement. A FCDF mod shelf concentration ratio of 1:1 will have less than adequate turn around space to support all of these requirements. In the preferred embodiment, an FCDF mod shelf termination ratio of 1:2 is optimal and allows up to 100% replacement capability.

Figure 8:
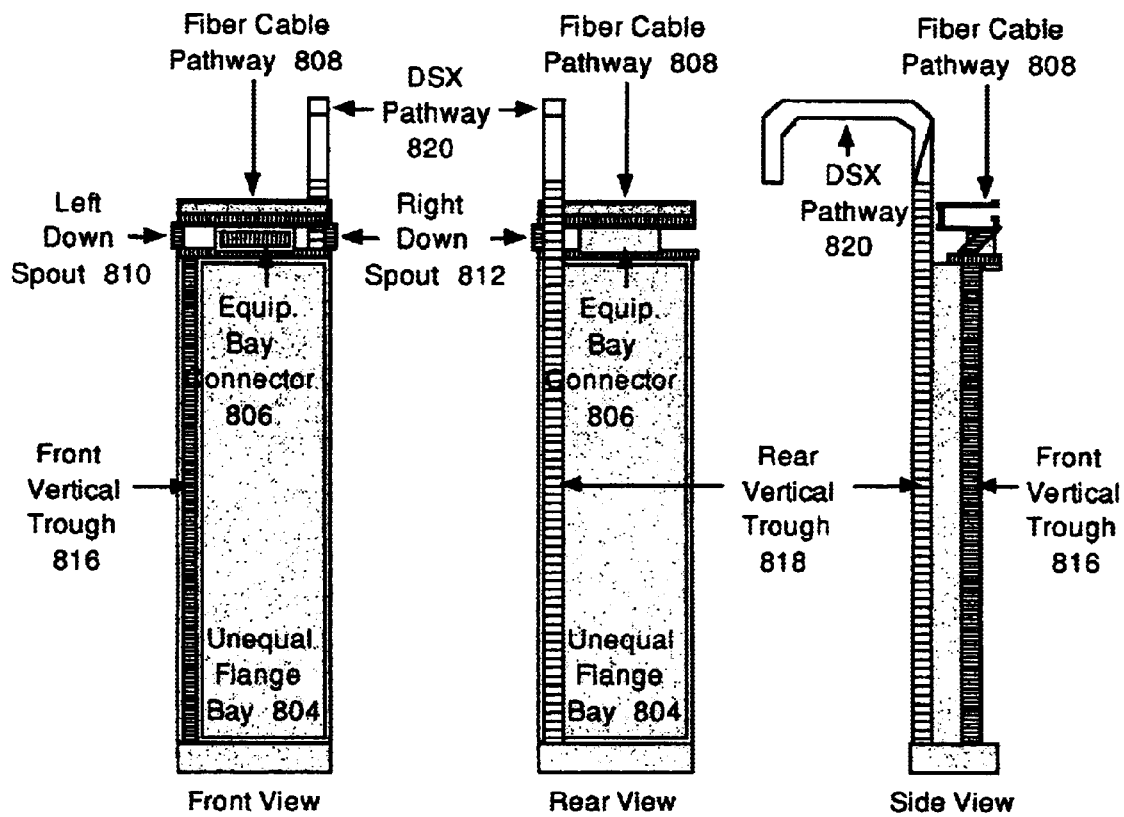
FIG. 8 illustrates a front, rear and side view of an example of a Standard Equipment Bay in accordance with one embodiment of the present invention.

As mentioned previously, each of the equipment lineups illustrated in FIGS. 1, 2, 3 and 4 consist of a series of connected standard equipment bays. FIG. 8 illustrates a front, rear and side view of an example of a standard equipment bay in accordance with one embodiment of the present invention. In FIG. 8, a center section of a standard equipment bay 802 comprises an unequal flange bay 804. The front view of the standard equipment bay 802 illustrates a front vertical trough 816 attached to the left side of the unequal flange bay 804. An equipment bay connector 806 is removably attached to the top of the unequal flange bay 804. Connector extensions (which facilitate a connection between an equipment bay connector 806 and a central office equipment placed in a mounting position within the unequal flange bay 804) are placed within the vertical trough 816. The top of standard equipment bay 802 is adapted to accommodate a section of fiber cable pathway 808. The fiber cable pathway (illustrated in FIG. 4) provides a pathway for prefabricated equipment cables which are connected between equipment bay connector 806 and a FCDF mod within the same Expansion Unit. The rear view of standard equipment bay 802 illustrates a rear vertical trough 818 attached to the left side of the unequal flange bay 804. The side view of standard equipment bay 802 illustrates a digital signal cross connect (DSX) pathway 820 removably attached to rear vertical trough 818. Right and left down spouts 810 and 812 respectively provide a path from the fiber cable pathway 808 to the equipment bay connector 806.

The standard equipment bay is an off the shelf assembly that expands the Fiber Center in all situations, regardless of application or location. As described below, deployment of prefabricated equipment cable is triggered by the deployment of an OSP cable from a customer location. When the demand to deploy a prefabricated equipment cable is such that there are insufficient equipment mounting positions (for example, less than six) in an existing equipment bay, the addition of another standard equipment bay is triggered. The equipment mounting positions may be in an equipped, an unequipped, or a spare state.

Each standard equipment bay is adapted to connect to additional standard equipment bays on either the left or right side of each standard equipment bay in response to demand specified on the equipment order (discussed below). When an equipment order calls for the equipment lineup to grow right, the standard equipment bay right down spout 812 is attached to the new equipment bay and vice versa. However, when the expansion is the first equipment bay in any equipment lineup, both the left and right down spouts are included. Regardless of which direction the equipment lineup is facing, the down spout is always positioned at the farthest point on the standard equipment bay away from the FCDF. This provides flexibility in relocating a specific equipment cable to a different equipment bay connector when preparing to re-equip a bay or group of bays. The prefabricated equipment cable passes beyond the equipment bay connector 806 and loops back, providing the additional cable necessary to reach the next equipment bay. As described below, equipment cable may be moved from one equipment bay to another in response to increased equipments per bay requirements when re-equipping a particular equipment bay. The DSX pathway provides the path for the (metallic) DSX cable from the back plane of the equipment on the equipment bay to the DSX cable rack.

Figure 9:
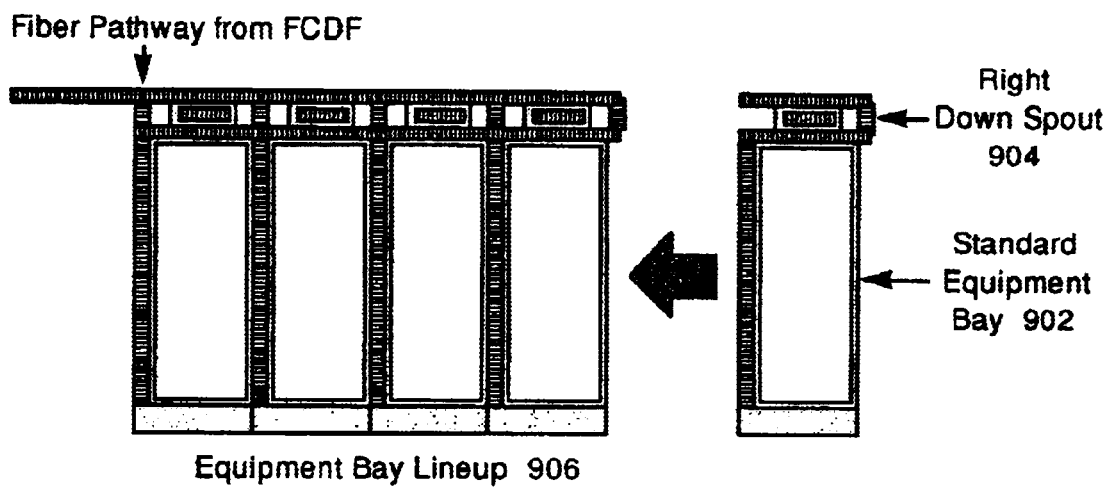
FIG. 9 illustrates an example of the addition of an equipment bay to an equipment lineup in accordance with one embodiment of the present invention.

FIG. 9 illustrates an example of the addition of an equipment bay to an equipment lineup in accordance with one embodiment of the present invention. In FIG. 9, standard equipment bay 902 includes right down spout 904 because equipment lineup 906 is growing to the right in response to demand. As mentioned above, the addition of a new equipment bay to an equipment lineup is triggered by the demand to deploy additional prefabricated equipment cable where there are less than six mounting positions remaining in the last equipment bay within the equipment lineup. In the preferred embodiment, one prefabricated equipment cable requires six remaining equipment mounting positions in the last equipment bay in the equipment lineup. This convention still applies when demand requires the deployment of high capacity equipments. In some Inter-Office or high density loop applications, the much larger physical size of the equipment required may result in the spreading of the equipment cable across two, three or six equipment bays. The two, three or six equipment should be deployed prior to deploying the equipment cable so that equipment bay connector housings are available to accommodate the equipment cable connector assemblies.

As previously mentioned, each central office equipment within equipment lineups 204 of FIG. 2 is connected to FCDF 202 via a prefabricated equipment cable and a connector extension. The connector extension runs from a particular central office equipment to the equipment bay connector attached to the standard equipment bay in which the equipment is mounted. The prefabricated equipment cable completes the connection between the particular central office equipment and the FCDF by running from the equipment bay connector along the fiber cable pathway to the FCDF where termination takes place as illustrated in the example of FIG. 6. The connector extension and the prefabricated equipment cable will now be discussed in greater detail.

Figure 10:
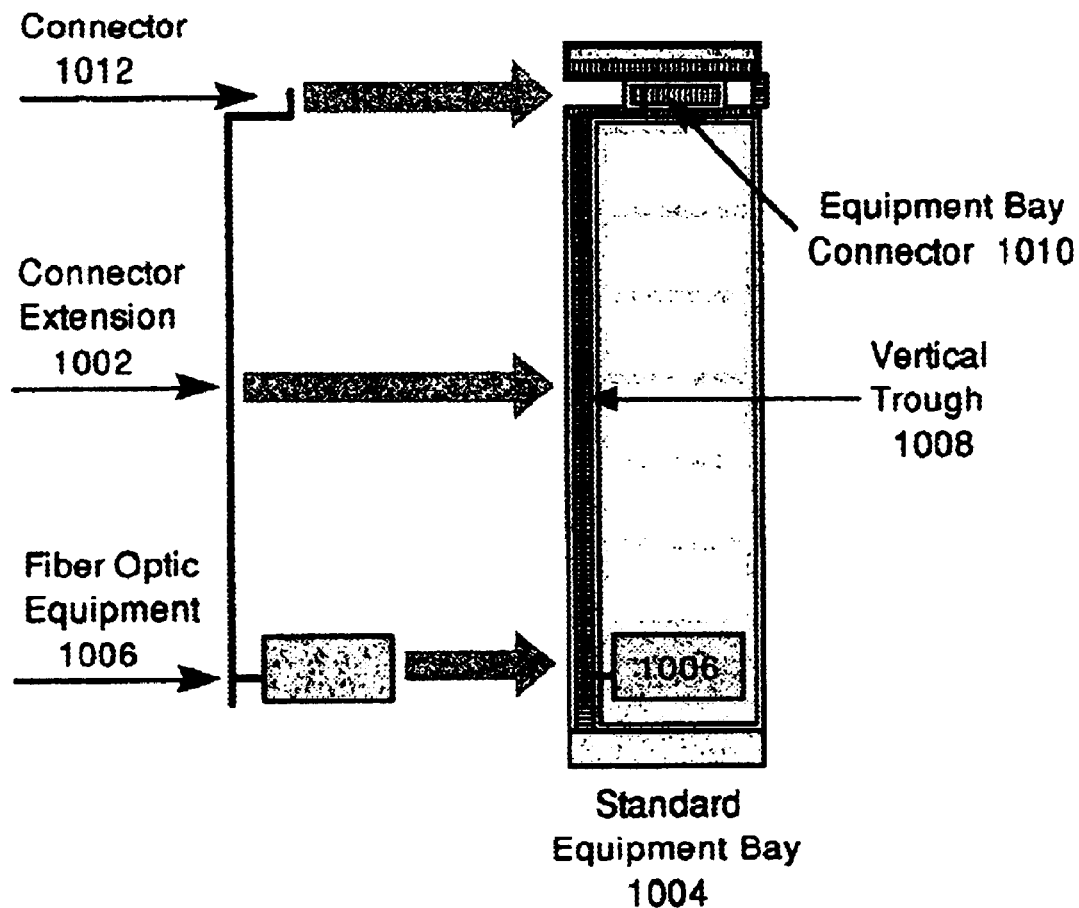
FIG. 10 illustrates an example of the installation of a central office terminal (equipment—COT) and Connector Extension in a Standard Equipment Bay in accordance with one embodiment of the present invention.

The connector extension may be, for example, a four fiber jumper from an individual central office equipment to the corresponding equipment bay connector. FIG. 10 illustrates an example of the installation of a central office equipment and connector extension in a standard equipment bay in accordance with one embodiment of the present invention. In FIG. 10, a central office equipment 1006 is initially outside of the standard equipment bay 1004. In the preferred embodiment, central office equipment 1006 arrives at the central office from the manufacturer with a standard length connector extension 1002 and a connector 1012 attached. Connector 1012 is adapted to connect to an equipment bay connector 1010. Equipment bay connector 1010 is removably attached to the top of standard equipment bay 1004. A vertical trough 1008 is attached to the left side of standard equipment bay 1004.

As indicated in FIG. 10, installing the central office equipment and connector extension into standard equipment bay 1004 entails placing and attaching a central office equipment 1006 in a mounting position within equipment bay 1004. Connector extension 1002 is placed within vertical trough 1008 and connector 1012 is connected to equipment bay connector 1010. Connector extension 1002 arrives from the central office equipment manufacturer sized to a standard length which will reach equipment bay connector 1010 from the lowest equipment mounting position in standard equipment bay 1004. Standardizing the size of the equipment bay in accordance with the preferred embodiment of the Fiber Center enables manufacturers of central office equipment to deliver the equipment with standard length connector extensions which will not require further customizing at the central office. Thus, the OTC can eliminate the steps of cutting custom length jumpers and splicing connectors to these custom length jumpers prior to installing a central office equipment in an equipment bay. Standard length connector extensions save money and expedite the deployment of central office equipment by eliminating the time spent customizing equipment cables and jumpers. Connector extension slack from the central office equipment mounted above the bottom mounting position is stored in the standard equipment bay vertical trough.

As mentioned above, in the preferred Fiber Center embodiment, prefabricated equipment cable completes the connection between central office equipment and the FCDF by running from the equipment bay connector along the fiber cable pathway to the FCDF. The physical organization and layout of the Fiber Center components described above enable accurate prefabrication of equipment cables in the preferred embodiment of the invention.

Figure 11:
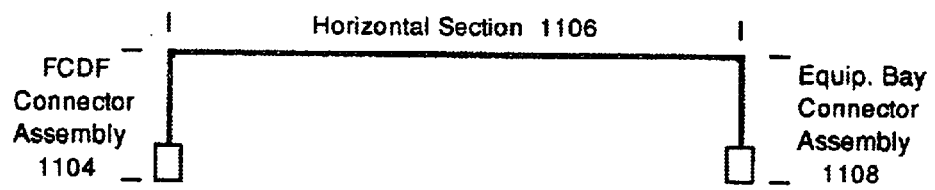
FIG. 11 illustrates an example of Prefabricated Equipment Cable, consisting of three sections, and how these three sections relate to the Fiber Center components in accordance with one embodiment of the present invention.
Figure 11:
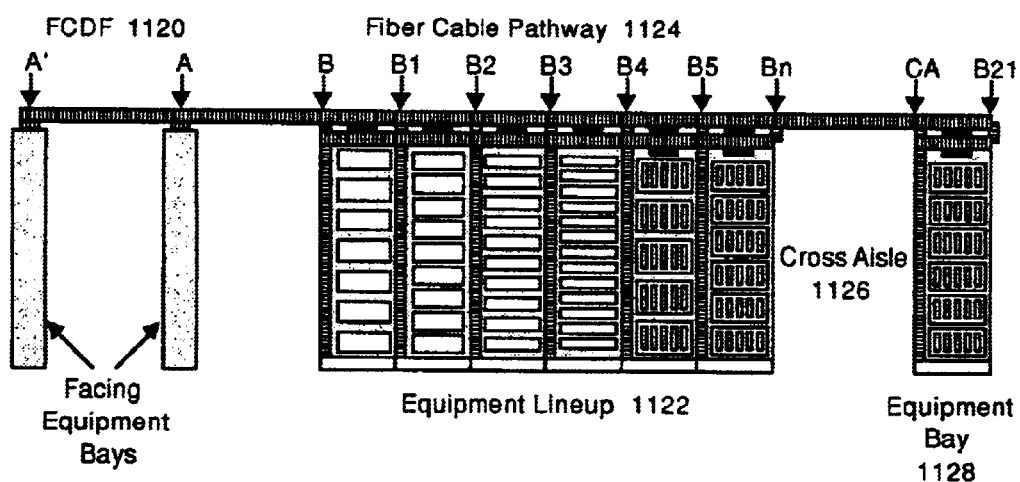

FIG. 11 illustrates an example of a prefabricated equipment cable, consisting of three sections, and how these three sections relate to Fiber Center components in accordance with an embodiment of the present invention. In FIG. 11, a prefabricated equipment cable 1102 comprises an FCDF connector assembly (standard length first section) 1104, a variable length horizontal second section 1106, and an equipment bay connector assembly (standard length third section) 1108. The FCDF connector assembly 1104 and the equipment bay connector assembly 1108 are spliced to opposite ends of the horizontal section 1106. When the prefabricated equipment cable 1102 is deployed to connect a central office equipment to an FCDF mod, the horizontal second section 1106 is deployed in the fiber cable pathway, the FCDF connector assembly 1104 runs from the fiber cable pathway to a cable port on the FCDF mod and equipment bay connector assembly 1108 runs from the fiber cable pathway down to the equipment bay connector attached to the standard equipment bay. The FCDF connector assembly 1104 and the equipment bay connector assembly 1108 will be discussed in greater detail below. FIG. 11 will be used to illustrate the method for determining the length of horizontal section 1106 in accordance with an embodiment of the invention.

The lower portion of FIG. 11 illustrates the application of benchmarks at down spouts over the length of the fiber cable pathway in accordance with one embodiment of the present invention. A benchmark is a visible indicator which highlights the location of a down spout in a fiber cable pathway. Equipment cables deployed in a Fiber Center fiber cable pathway pass through down spouts and therefore benchmarks, to access particular Fiber Center components directly below the fiber cable pathway. Reference marks may consist, for example, of numbers and/or letters painted on the fiber cable pathway. In the lower portion of FIG. 11, a pair of facing FCDF mods 1120 are connected to an equipment lineup 1122 via a fiber cable pathway 1124. A cross aisle 1126 is a space between equipment bays in the equipment lineup 1122 which may permit, for example, OTC employees to walk between equipment lineups. In FIG. 11, benchmarks which indicate the location of down spouts (not shown) over the fiber cable pathway, are labeled alphabetically. For example, the benchmark labeled "B1" highlights the location of the down spout over the fiber cable pathway 1124 which is above the first equipment bay in the equipment lineup 1122.

The use of benchmarks in Fiber Center fiber cable pathways enables an accurate determination of the length of the variable horizontal equipment cable section 1106 and therefore, the ability to prefabricate all equipment cable that is to be deployed to correspond to the predetermined distances. Lengths A'A (the length between the pair of FCDF mods 1120), AB (the length between the first equipment bay in the equipment lineup and the FCDF mod closest to that equipment bay), BnCA (the length of cross aisle 1126) and BnCA' (the length of the second cross aisle, not shown) in FIG. 11 are measured on site at the time central office facilities are installed. Length BBn is dependent on the number of equipment bays in equipment lineup 1122 and is readily determined. The use of standard equipment bays determines that the length BBn always corresponds to a multiple of the width of an equipment bay (for example, a standard equipment bay may have a width of 26 inches). The length of a horizontal section of a prefabricated equipment cable required to reach from FCDF 1120 to any standard equipment bay in equipment lineup 1122 is the sum of lengths AB, A'A, BnCA, BnCA' and BBn, where BnCA is the length of the first cross aisle 1126, BnCA' the length of a second cross aisle (not shown) and BBn is the number of standard equipment bays×26 inches.

The following example will illustrate the use of benchmarks such as those illustrated in FIG. 11. Suppose demand requires an equipment cable to be deployed from the upper or lower Growth Unit on the FCDF marked A' in FIG. 11 to a mounting position in standard equipment bay 1128. The following lengths are measured on site at the time of the facility installation: length AB=66", A'A=60", and CA=60". The number of equipment bays in the equipment lineup is 21, therefore BBn=21×26"=546". Thus, the total horizontal length required for a prefabricated equipment cable to reach from the FCDF (benchmark A') to standard equipment bay 21 in the equipment lineup (benchmark B21 is 732" or 61". The equipment cable, including the appropriate connector assemblies at each end, is prefabricated to include the horizontal length, plus sufficient slack to facilitate connections. Corresponding reference marks (A' and B21) are marked on the prefabricated equipment cable to assist in deploying the cable in the fiber cable pathway.

Figure 12:
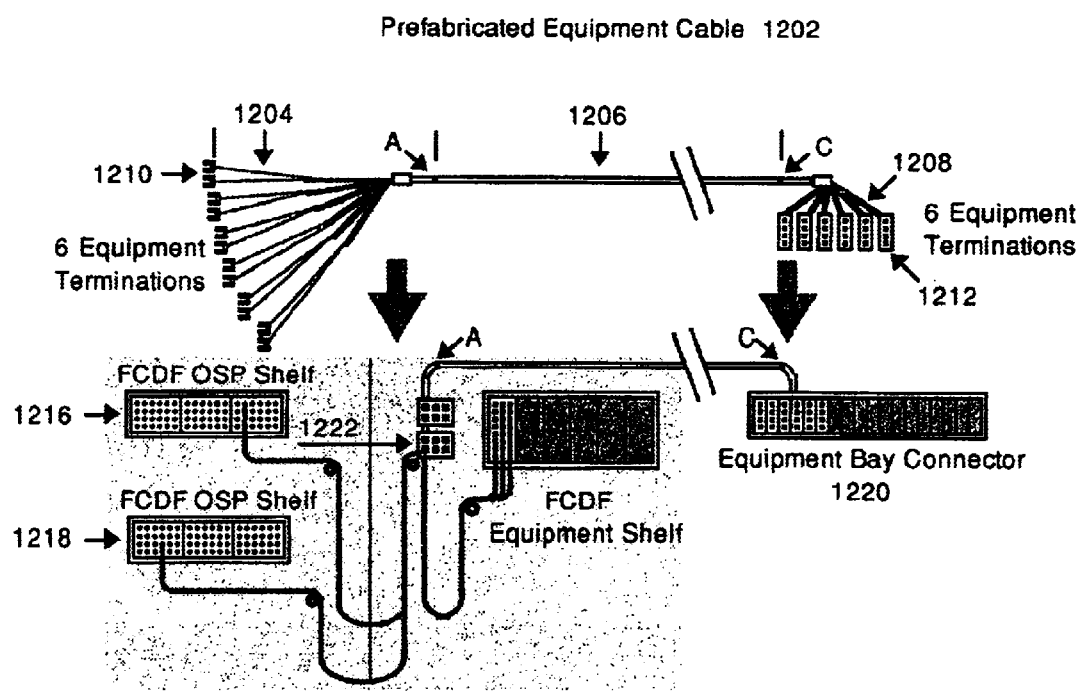
FIG. 12 illustrates examples of FCDF and equipment connector assemblies in accordance with one embodiment of the present invention.

FIG. 12 illustrates examples of FCDF and equipment bay connector assemblies in accordance with one embodiment of the invention. The upper portion of FIG. 12 illustrates the three sections of the prefabricated equipment cable. The lower portion of FIG. 12 illustrates an example of how the FCDF and equipment bay connector assemblies of this same prefabricated equipment cable relate to previously described Fiber Center components when the cable is deployed.

As illustrated in the upper portion of FIG. 12, prefabricated equipment cable 1202 comprises three sections: a FCDF connector assembly (standard length first section) 1204, a horizontal second section 1206, and a equipment bay connector assembly (standard length third section) 1208. The FCDF connector assembly 1204 and the equipment bay connector assembly 1208 are spliced to opposite ends of the horizontal section 1206 of the prefabricated equipment cable 1202. FCDF connectors 1210 are attached to one end of the FCDF connector assembly 1204. Connectors 1212 are attached to one end of the equipment bay connector assembly 1208. Reference mark "A" indicates the location where the prefabricated equipment cable 1202 may be placed relative to a corresponding benchmark labeled "A" at the down spout in a fiber cable pathway above an FCDF mod (as described above). Similarly, reference mark "C" indicates the location where the prefabricated equipment cable 1202 may be placed relative to the corresponding benchmark labeled "C" at a down spout in a fiber cable pathway above the standard equipment bay (as described above). The lower portion of FIG. 12 illustrates two Growth Unit OSP shelves 1216 and 1218 (as previously described) within an FCDF mod and an equipment bay connector 1220 (as previously described).

In the preferred embodiment of the Fiber Center, the FCDF connector assembly 1204 (the length of equipment cable 1202 between reference mark A and the FCDF connectors 1210 in FIG. 12) comprises six quad fiber jumpers spliced to a 24 fiber equipment cable 1202. Each of the six quad fiber jumpers is spliced to two dual fiber jumpers that terminate to single FCDF connectors 1210. The total length of FCDF connector assembly 1204 is standardized to reach, for example, from a point in a down spout below a fiber cable pathway above the FCDF, pass through equipment cable port 1222 and reach to the farthest OSP connectors in a particular Growth Unit within that particular FCDF mod. This arrangement enables any supporting equipment termination to be interconnected to any OSP termination within the Growth Unit.

The lower portion of FIG. 12 illustrates an example of how the jumpers of FCDF connector assembly 1204 might be interconnected on two Growth Unit shelves. These jumpers function as the stored and assigned (interconnected) jumpers illustrated in FIG. 7. When prefabricated equipment cable 1202 is deployed, second section 1206 is run in the fiber cable pathway (not shown). Reference mark A of the prefabricated equipment cable 1202 is located at the corresponding benchmark in the fiber cable pathway (not shown) above the FCDF mod which includes shelves 1216 and 1218. The FCDF connector assembly is run from benchmark A down the rear (cable side) of the FCDF mod to the equipment cable port 1222. The 24 fiber equipment cable portion of the FCDF connector assembly is secured in equipment cable port 1222 after the connector end of the FCDF connector assembly has been passed through cable port 1222. The connectors may then be stored in the equipment side of the FCDF mod or interconnected to their assigned OSP terminations on shelves 1216 and 1218 within the same FCDF mod as illustrated.

Third section 1208 (the length of prefabricated equipment cable 1202 between reference mark C in FIG. 12 and the connectors 1212 is a harness assembly that is spliced to a 24 fiber equipment cable 1202 in the preferred embodiment of the Fiber Center. The length of third section 1208 is standardized to extend from benchmark C in the fiber cable pathway above an equipment bay to the equipment bay connector housing of the equipment bay. Connectors 1212 are adapted in groups of four to mount in the equipment bay connector housing attached to the standard equipment bays.

The lower portion of FIG. 12 illustrates how third section 1208 relates to an equipment bay connector on an equipment bay. When prefabricated equipment cable 1202 is deployed, reference mark C is aligned to the corresponding benchmark C in the fiber cable pathway (not shown) above the desired equipment bay (not shown). Connectors are then mounted in the equipment bay connector housing 1220.

Prefabricated equipment cable is reference marked at the midpoint of all cross aisle locations to assist in future cable redistribution and mining operations. To accommodate the continued reduction in physical equipment size which is anticipated in the future, the prefabricated equipment cable can be assembled to access the future shelf plug-in units of the optical ports of a digital switch or ports of an optical switch. The overall prefabricated equipment cable assembly is basically the same as described above, except that standard length third section is a length dependent on the specific mounting location within the equipment bay which is readily determined. The significantly larger physical size of inter-office (I/O) or other high capacity equipment may require the prefabricated equipment cable to be spread over two, three or six equipment bays. The equipment bay connector assembly of a prefabricated equipment cable may be configured to access two or more consecutive equipment bays in accordance with an embodiment of the present invention.

Prefabricated equipment cable may also be assembled to accommodate cross connect when required by specific demand. The Fiber Center enables the user to deploy equipment cable that may be prefabricated, assembled on site or upgraded on site. Any of a number of connector assemblies may be utilized on either the FCDF or the equipment bay end of the prefabricated equipment cable in response to specific demand.

The assembly of prefabricated equipment cable, as described above, enables the user to not only prefabricate all new equipment cable, but also to upgrade existing equipment cable from an equipment bay connector termination assembly to a shelf plug-in termination assembly. The physical operation of upgrading these connector assemblies entails first locating the previously established reference mark on the deployed prefabricated equipment cable. Next, the prefabricated equipment cable is cut at the reference mark and the existing equipment bay connector assembly is removed. Finally, the new replacement shelf plug-in connector assembly is spliced to the prefabricated equipment cable at the reference mark.

Prefabricated equipment cables may also be marked with identification information to facilitate the redistribution, reuse and/or removal of the cable. The cable ID is written in a form which indicates the origin and endpoint of a cable (from +to). The "from is" nn (FCDF #)–nnn (FCDF mod #)–nn (FCDF shelf and block). The "to" is nnn/a–f or nn (equipment bay)/(connector block or shelf and block). Thus, a cable ID 01–008–32+014/b identifies the cable as from FCDF 01, mod 008, shelf 3, block 2 to equipment bay 014, connector block b. Cable ID is physically marked to the right and left of the reference marks including those that align to the midpoint of the cross aisles.

The process of assembling a Fiber Center in accordance with an embodiment of the present invention will now be described with reference to the components described above. In many of the OTCs, the engineering and operations are separated by outside and inside work functions. The process and apparatus of Fiber Center positions the OTC to blend both outside and inside functions into one, gain significant cost efficiencies in both material and labor, and deliver a superior product. The primary focus of Fiber Center is to respond to demand, whether Inter-Office (between central offices) or Loop (between the customer locations and the central office). Predeployment of central office equipment is an option that is available for extraordinary circumstances. Demand requires the OTC to provide service to a particular location. If no spare cable facilities exist, the demand is interpreted as a requirement to build a cable and equip a span in that cable. If spare cable facilities exist, the demand requires that a span in that cable be equipped. Both the outside activities and the inside responses are interdependent. Activity outside triggers a response inside. When an OSP cable is deployed outside, a prefabricated equipment cable is deployed inside. When a customer location is equipped outside, an equipment bay mounting position is equipped inside. The process involves constructing a physical fiber infrastructure (defined as all the fiber cable from the customer location through the FCDF to the central office equipment) and equipping the physical fiber infrastructure.

In response to demand, whether from a customer location or other central office, the OSP cable from the customer location (or other central office) is assigned to a specific location within a splicing area (described below), a specific Growth Unit within a specific FCDF mod and a specific shelf within that Growth Unit. This activity, in turn, triggers cabling an adjacent equipment shelf in the FCDF mod over a fiber cable pathway to the next available central office equipment location. The physical deployment of the OSP facility cable, in fact, triggers the deployment of a complement of groomed and linked equipment cable to a group of locations within the equipment lineup. One of the locations will ultimately be equipped and provide service to a particular customer location. The physical fiber infrastructure, both outside and inside, is constructed as one.

Once the physical fiber infrastructure is constructed, the next step entails equipping the fiber infrastructure. The equipping of a specific span in the physical fiber infrastructure is initiated simultaneously at the customer location or other central office and in the Fiber Center (whether the remote equipment is provided by the customer or the OTC). The equipping of the physical fiber infrastructure is the deployment of equipment to both ends of the fiber span in response to either customer demand or network requirement. These demands and requirements are the triggers to equip an optical span and will identify the particular fiber optic facility cable and count to be equipped. A specific Growth Unit is identified along with the available equipment locations and associated equipment terminations within the Growth Unit. The demand triggers the assignment of the next available spare equipment location and equipment terminations within that Growth Unit. The physical fiber infrastructure, both outside and inside, is equipped as one.

Figure 13:
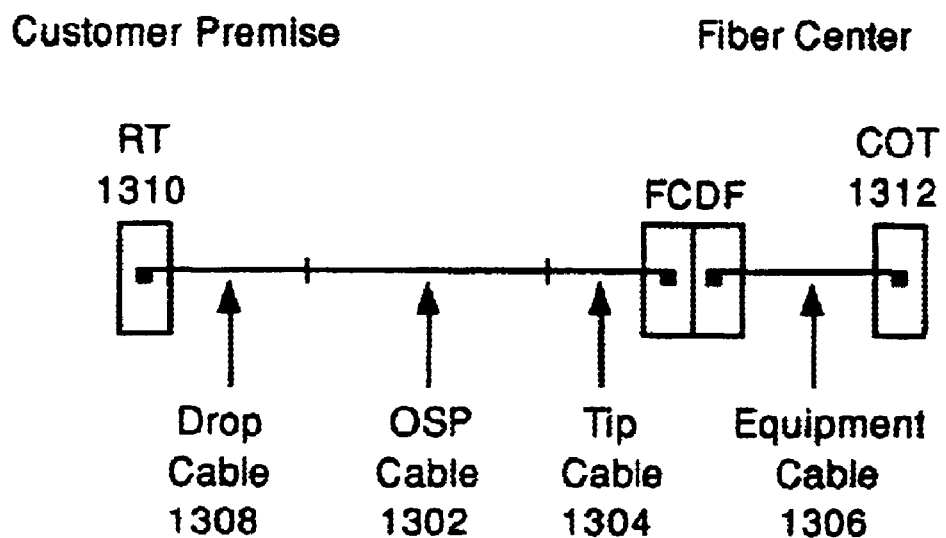
FIG. 13 illustrates an example of the sequential assembly of the components necessary to establish the physical fiber cable infrastructure in the distribution loop and the equipping of a specific span within the infrastructure in accordance with one embodiment of the present invention.

FIG. 13 illustrates the sequential assembly of the components necessary to establish the physical fiber cable infrastructure in a loop and the equipping of a span within the infrastructure in accordance with one embodiment of the invention. However, the present invention also covers assembling components to establish the physical fiber cable infrastructure in an inter-office network and equipping a specific span within that infrastructure. Activity outside the Fiber Center is complemented by activity inside the Fiber Center. First, an OSP cable 1302 and a tip cable 1304 are deployed. In response, a prefabricated equipment cable 1306 is deployed in the Fiber Center. Next, a drop cable 1308 and a remote terminal (RT)(also referred to as a "remote equipment") 1310 are deployed at the customer location and a central office terminal (COT) (also referred to as "central office equipment") 1312 is deployed in the central office. The RT 1310 may be provided by either the customer or the OTC.

Figure 14:
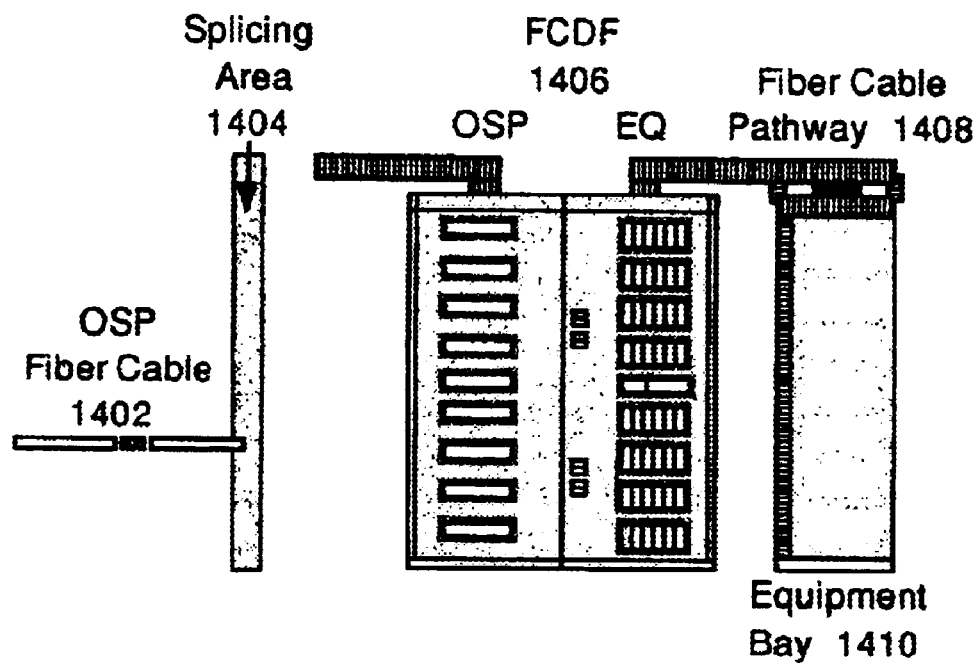
FIG. 14 illustrates an example of the deployment of an initial OSP cable in accordance with one embodiment of the present invention.

The entire fiber cable is assembled both outside and inside and equipped at both ends. An activity outside triggers an activity inside. FIG. 14 illustrates an example of the deployment of an initial OSP cable in accordance with one embodiment of the present invention. Once an OSP cable 1402 is deployed, a FCDF 1406, a fiber cable pathway 1408 and an initial equipment bay 1410 are deployed within the fiber center.

Figure 15:
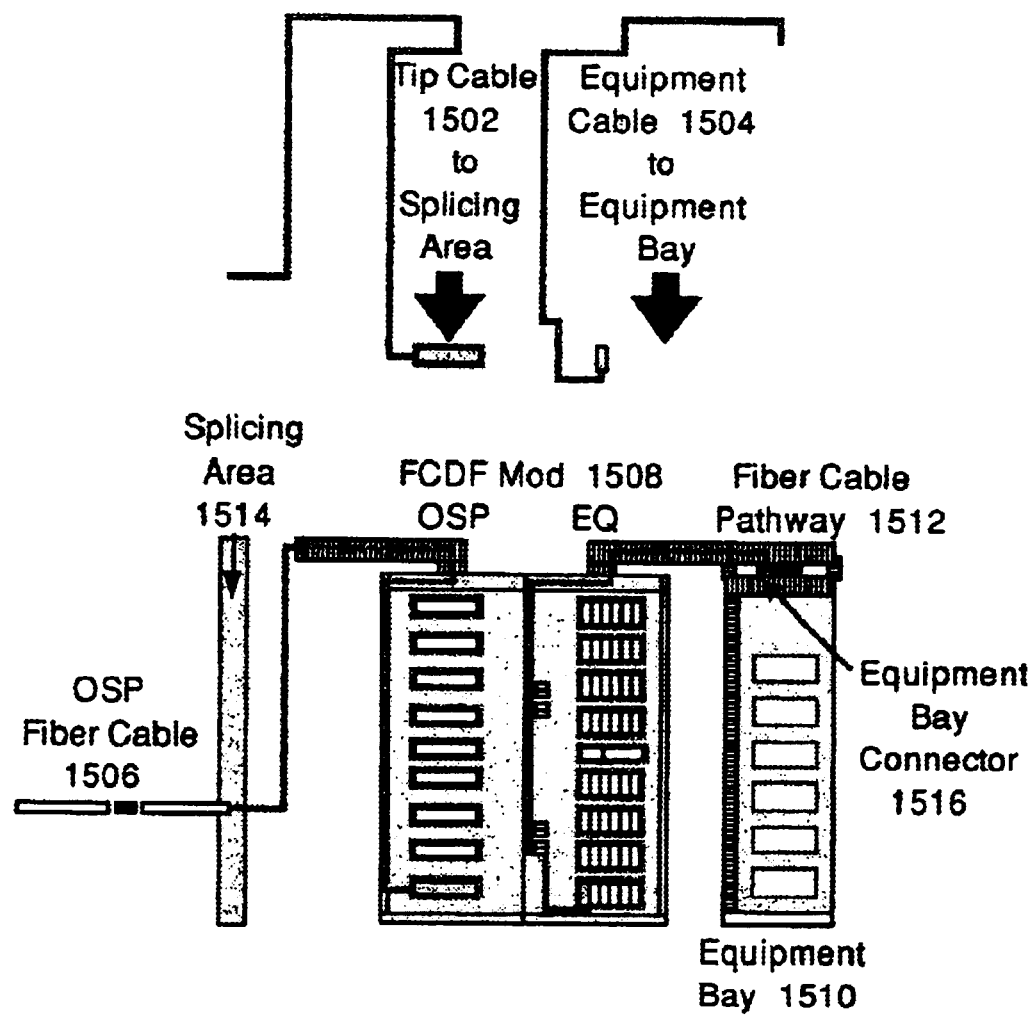
FIG. 15 illustrates an example of the deployment of a tip cable and a prefabricated equipment cable within the Fiber Center facilities illustrated in FIG. 13 in accordance with one embodiment of the present invention.

Following the activity illustrated in FIG. 14, a tip cable is deployed from the splicing area to the OSP side of the Growth Unit within the FCDF. FIG. 15 illustrates an example of the deployment of a tip cable and a prefabricated equipment cable within the Fiber Center facilities illustrated in FIG. 14 in accordance with one embodiment of the present invention. When deployed, one end of the tip cable 1502 is spliced to OSP fiber cable 1506 in splicing area 1514. Another end of tip cable 1502 terminates on the OSP side of a Growth Unit within the FCDF 1508. The deployment of tip cable 1502 is followed by the deployment of a groomed and linked prefabricated equipment cable 1504 from an adjacent equipment shelf in the same FCDF Growth Unit along the fiber cable pathway 1512 to an equipment bay connector 1516 attached to standard equipment bay 1510. At this point all the jumpers spliced to prefabricated equipment cable 1504 as part of the FCDF connector assembly are stored on the equipment side of the Growth Unit within the FCDF mod 1508.

The next steps in assembling the OSP and equipment cables which will connect the customer location to a central office equipment entail the following: 1) deploying a drop cable to the equipment (remote terminal) at the customer location, 2) moving at least one stored prefabricated equipment cable jumper from the equipment side of the Growth Unit to an assigned position on the OSP side of the same FCDF Growth Unit (as described with reference to FIG. 7 above), and 3) mounting a C.O. Terminal and deploying the connector extension from the C.O. Terminal in the equipment bay to the equipment bay connector at the top of the equipment bay (as described with reference to FIG. 10).

Figure 16:
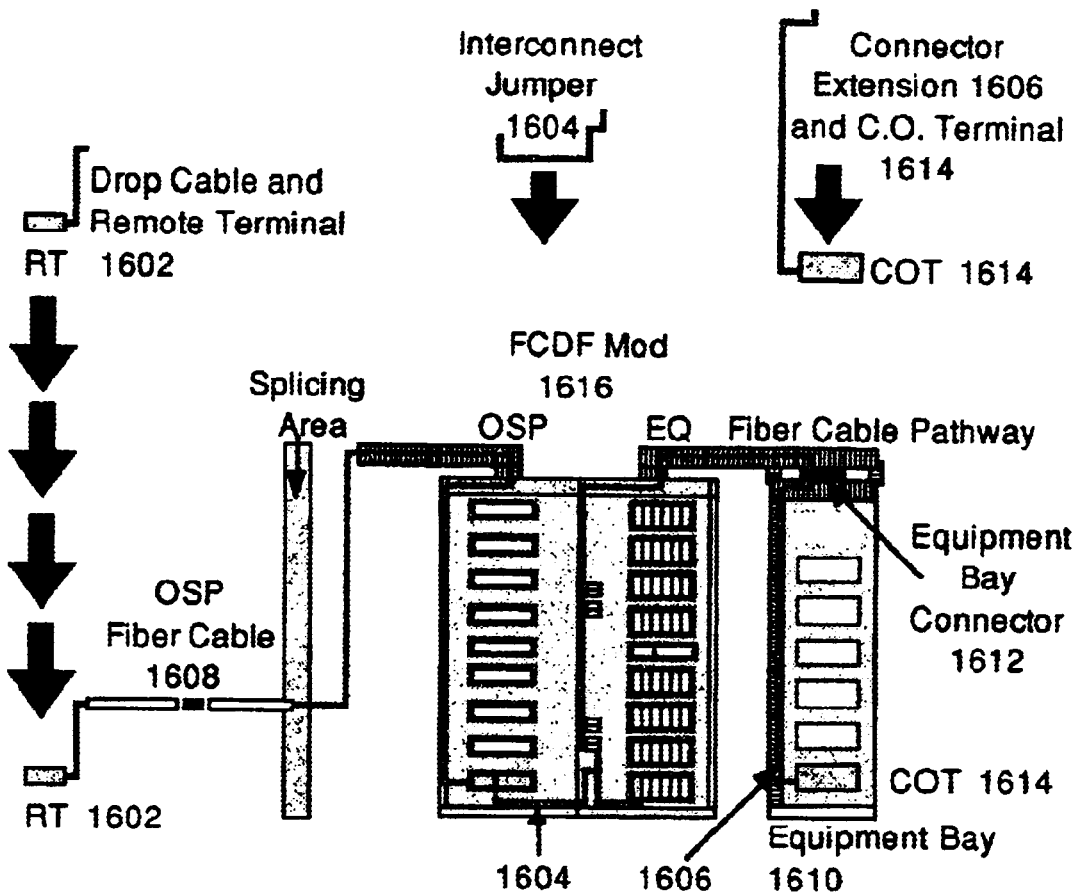
FIG. 16 illustrates an example of the deployment of a drop cable and Remote Terminal (RT), an interconnect jumper, and a Central Office Terminal (COT) with a Connector Extension within the Fiber Center facilities illustrated in FIG. 13 in accordance with one embodiment of the present invention.

FIG. 16 illustrates an example of the deployment of a drop cable and remote terminal (equipment), an interconnect jumper, a C.O. Terminal and a connector extension within the Fiber Center facilities illustrated in FIG. 14 in accordance with one embodiment of the present invention. A drop cable and a remote terminal 1602 are connected to an OSP fiber cable 1608 at the customer or other central office location. A central office terminal 1614 with an attached connector extension 1606 is deployed in the next available equipment mounting position in equipment bay 1610. A connector extension 1606 is connected to the first available terminations on an equipment bay connector 1612. Finally, an interconnect jumper 1604 is moved from the stored position in the equipment shelf of the Growth Unit within a FCDF mod 1616 and assigned to appropriate terminations on the adjacent OSP shelf.

Figure 17:
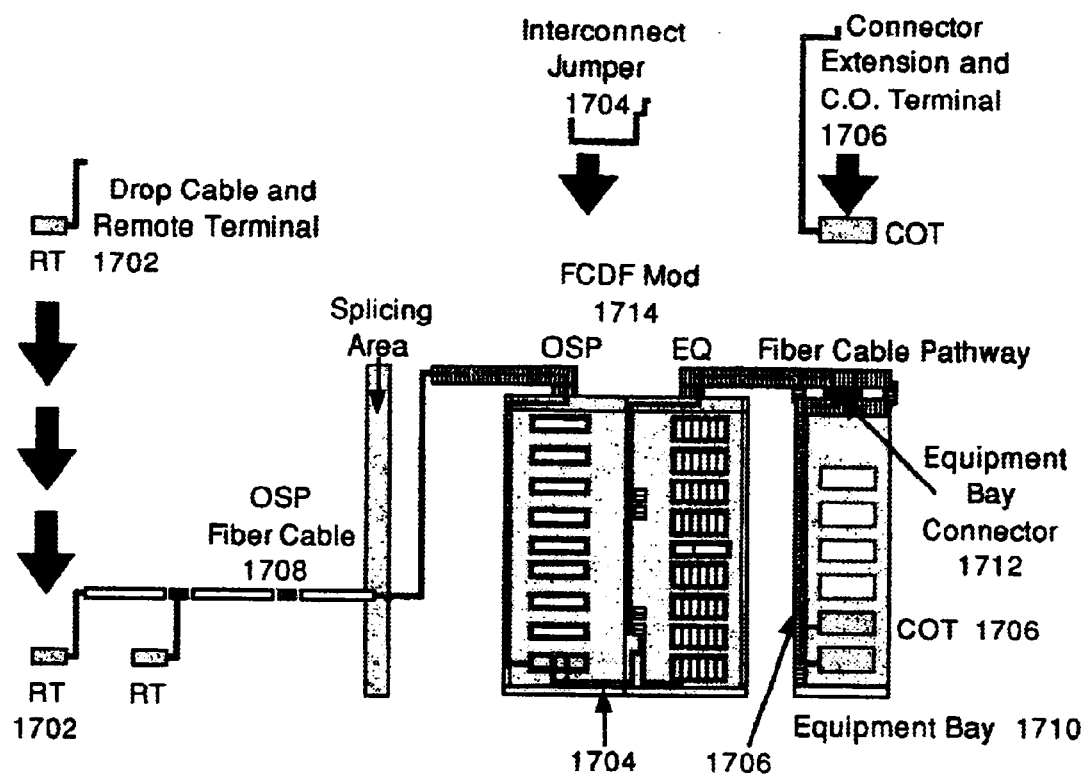
FIG. 17 illustrates an example of connecting an additional RT to the OSP cable of FIG. 14, the resultant deployment of an additional central office equipment and the interconnection to the assigned OSP terminations on the FCDF in accordance with one embodiment of the present invention.

When an additional drop cable and remote terminal are deployed at a customer location served by the same OSP cable illustrated in FIGS. 14–16, an additional central office equipment is deployed in the next available equipment bay mounting position. The respective groomed and linked equipment terminations are interconnected to the assigned OSP terminations on the FCDF. FIG. 17 illustrates an example of connecting an additional drop cable and remote equipment to the OSP cable of FIG. 14, the resulting deployment of an additional central office equipment and the interconnection to the assigned OSP terminations on the FCDF in accordance with an embodiment of the present invention. First, a remote terminal equipment and associated drop cable 1702 are deployed at the customer location and connected to an OSP fiber cable 1708. Next, a central office equipment and an attached connector extension 1706 are deployed to the next available mounting position within an equipment bay 1710. The connector extension 1706 is connected to the first available terminations on an equipment bay connector 1712. Finally, an interconnect jumper 1704 is moved from the stored position on the inside plant (equipment) side of the Growth Unit within a FCDF mod 1714 and assigned and connected to terminations on an adjacent OSP shelf within the same Growth Unit.

If a new OSP cable is deployed and terminated on the FCDF with a tip cable, the deployment of a groomed and linked prefabricated equipment cable is triggered. The deployment of the prefabricated equipment cable may trigger the addition of an equipment bay to the equipment lineup should there be insufficient mounting positions available on the existing equipment bay. As mentioned previously, in the preferred Fiber Center embodiment, the deployment of a new equipment bay is triggered by the deployment of a prefabricated equipment cable to an equipment bay that has less than six equipment mounting positions remaining.

Figure 18:
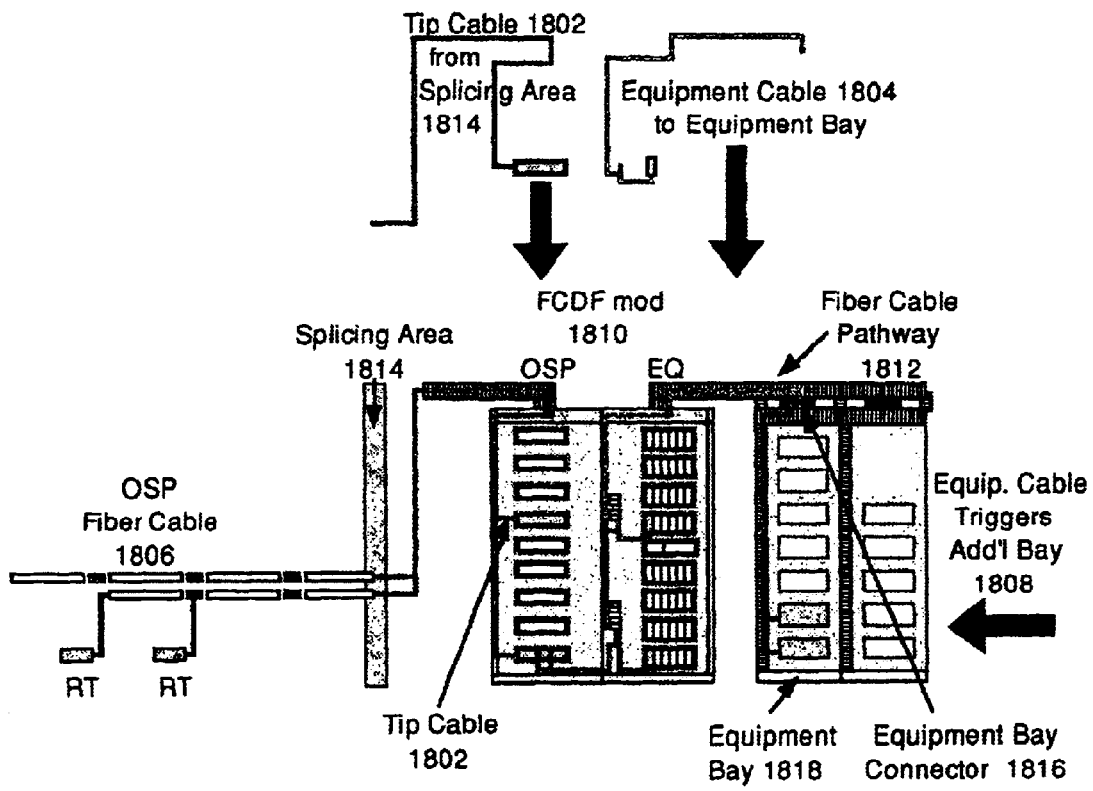
FIG. 18 illustrates an example of deploying an additional OSP cable with a tip cable, and the resultant deployment of both a Prefabricated Equipment Cable and an additional equipment bay within the Fiber Center facilities of FIG. 13 in accordance with one embodiment of the present invention.

FIG. 18 illustrates an example of deploying an additional OSP cable with a tip cable, and the resulting deployment of a prefabricated equipment cable and an additional equipment bay within the Fiber Center facilities of FIG. 14 in accordance with an embodiment of the present invention. When deployed, one end of a tip cable 1802 is spliced to an OSP fiber cable 1806 in Art a splicing area 1814. The other end of the tip cable 1802 terminates on the OSP side of a Growth Unit within the FCDF 1810. This activity is followed by the deployment of a groomed and linked prefabricated equipment cable 1804 from an adjacent equipment shelf in the same FCDF Growth Unit along a fiber cable pathway 1812 to an equipment bay connector 1816 which is attached to an equipment bay 1818. At this point all the jumpers spliced to prefabricated equipment cable 1804 as part of the FCDF connector assembly are stored in the equipment side of the Growth Unit within the FCDF mod 1810. Because there are less than six unequipped mounting positions within the equipment bay 1818 at the time the prefabricated equipment cable 1804 is deployed, an additional equipment bay 1808 is added to the equipment lineup.

As the equipment lineup grows with the addition of equipment bays, the length of the horizontal section of the prefabricated equipment cable increases in increments equal to the width of a standard equipment bay (for example, 26") and the width of a cross aisle (for example, 4–5') when cross aisles become applicable (for example, after 20 bays are included in an equipment lineup).

Figure 19:
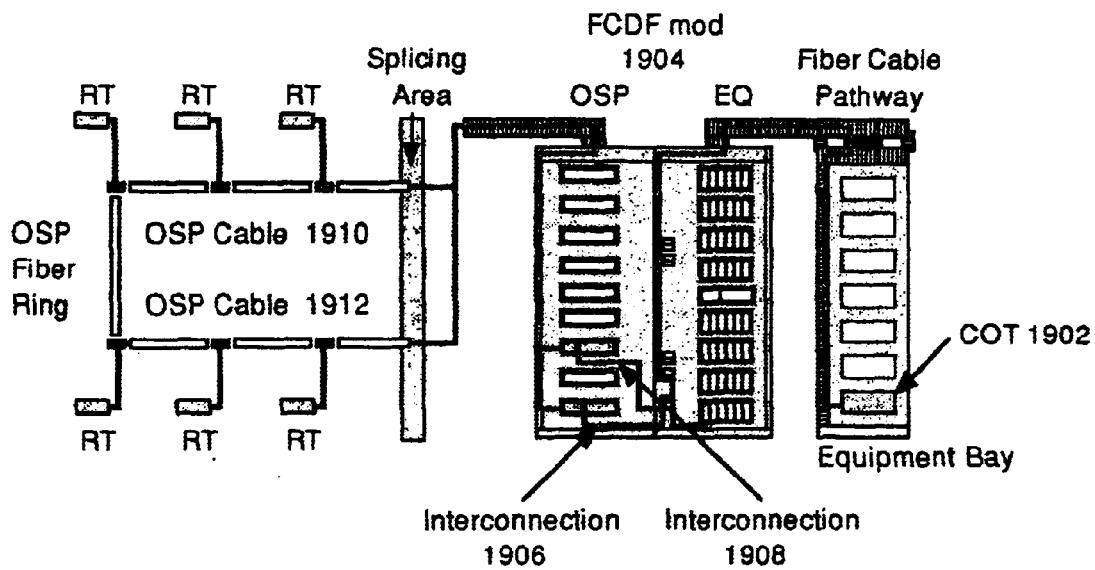
FIG. 19 illustrates an example of a Fiber Center component deployment in response to an OSP ring configuration in accordance with one embodiment of the present invention.

FIGS. 14–18, described above, illustrate the deployment of the Fiber Center physical fiber infrastructure and equipment when the OSP is in a point to point configuration. The present invention is also adaptable for deploying the physical fiber infrastructure and equipment when the OSP is in a ring configuration. FIG. 19 illustrates an example of a Fiber Center component deployment in response to OSP in a ring configuration in accordance with one embodiment of the present invention. In FIG. 19, COT (central office terminal) 1902 is interconnected to two pairs of OSP terminations 1906 and 1908 on two separate shelves within the same Growth Unit in a FCDF mod 1904. Two complements of OSP cable 1910 and 1912 are deployed over separate cable routes within a specific serving area and terminated within the same Growth Unit in the FCDF mod 1904.

Figure 20:
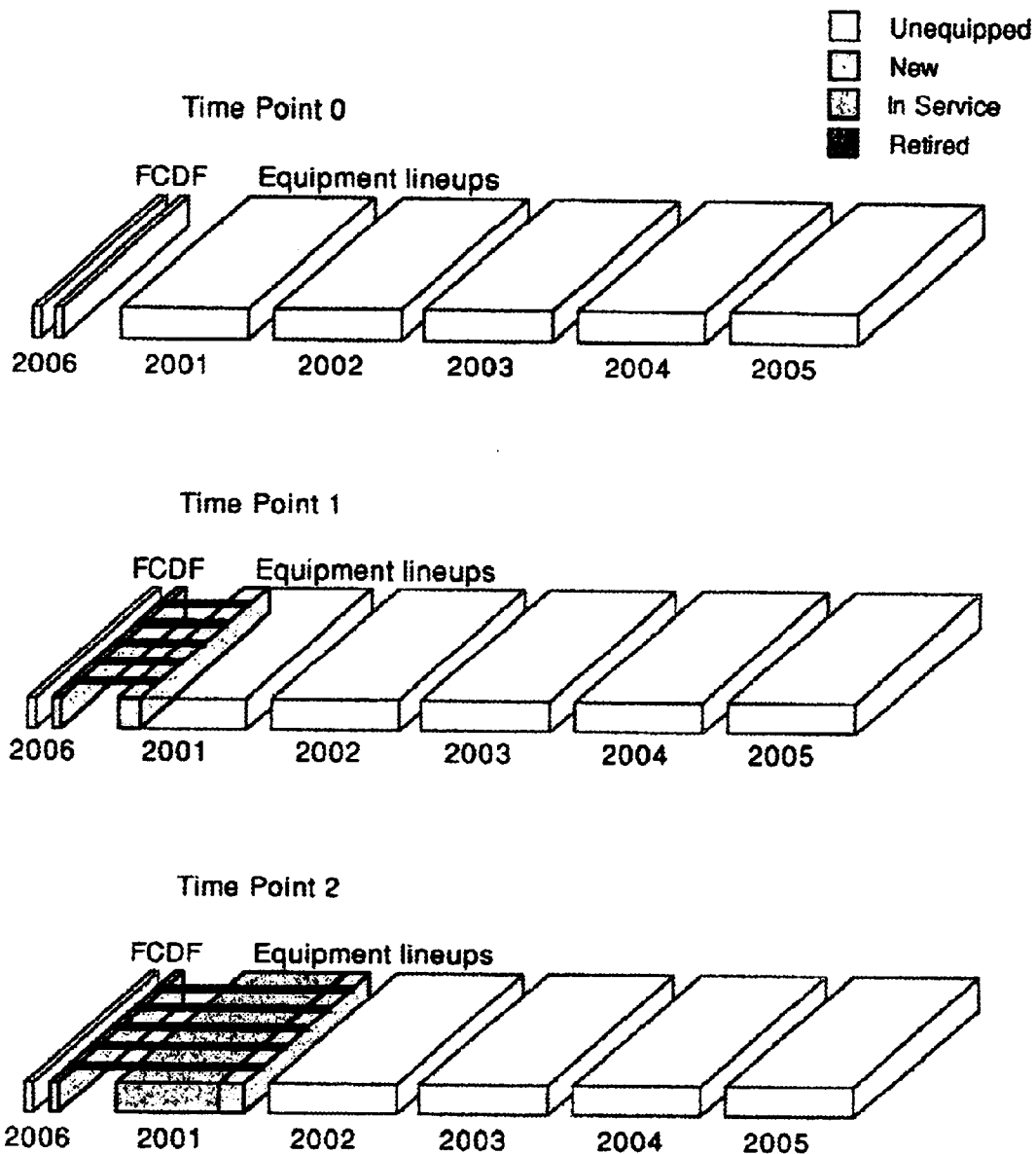
FIGS. 20 illustrates an example of the first three of nine time points in the deployment and evolution of a Fiber Center in accordance with one embodiment of the present invention.

The apparatus and process of the present invention is designed to evolve over time in an organized, flexible and manageable fashion. The Fiber Center embodiment illustrated in FIGS. 20–22 demonstrates the space planning and management capability the present invention provides the user OTC. FIG. 20 illustrates an example of the first three of nine time points in the deployment and evolution of a Fiber Center in accordance with one embodiment of the present invention. Each of blocks 2001 through 2005, to the right of a FCDF 2006, represent the floor space that can accommodate a number of parallel equipment lineups each comprising twenty standard equipment bays. The spaces in between blocks 2001 and 2005 represent cross aisles. The equipment lineup blocks (2001 through 2005) will be occupied by stand alone central office equipment, switch equipment or both at various times over the life expectancy of the fiber infrastructure. Time point 0 illustrates an initial floor plan designed to grow left to right from a FCDF 2006. Time point 1 illustrates the establishment of the FCDF 2006 and the initial deployment of equipment bays in block 2001. Continued deployment of equipment occupies all of block 2001 during time point 2. A facing lineup is added to FCDF 2006 in response to continued demand for OSP facilities.

Figure 21:
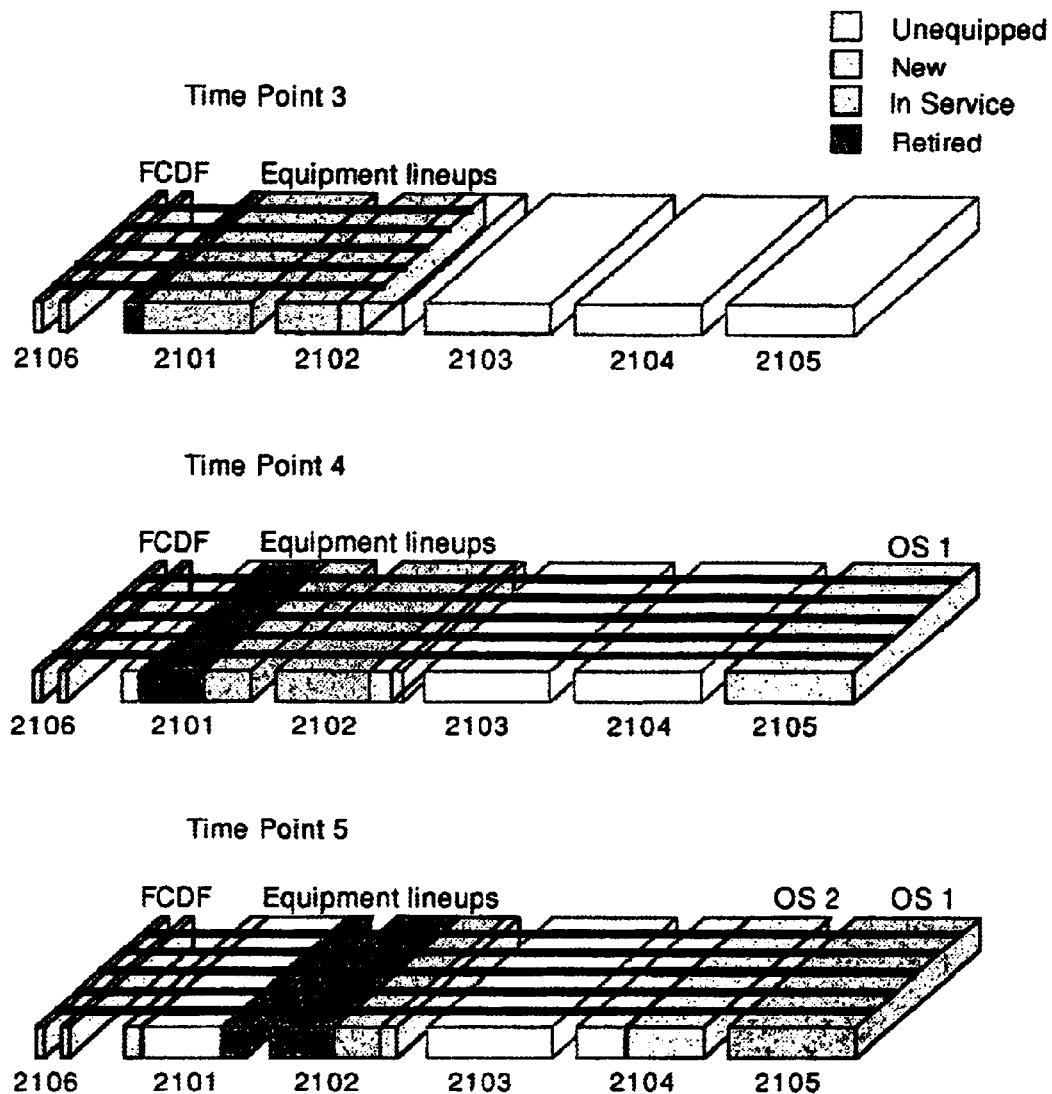
FIGS. 21 illustrates an example of the second three of nine time points in the deployment and evolution of a Fiber Center in accordance with one embodiment of the present invention.

FIG. 21 illustrates an example of the second three of nine time points in the deployment and evolution of a Fiber Center in accordance with one embodiment of the present invention. At time point 3 equipment expansion continues into block 2102 of the equipment lineups to enable upgrades to new technology. The oldest equipment (in block 2101 of time point 3), having been made spare as a result of upgrades, is retired. The initial optical switch, OS 1, is deployed in block 2105 during time point 4 and triggers upgrades from stand alone equipment to switch technology which causes significant numbers of stand alone equipment to be made spare. The migration from stand alone to switch equipment takes place over time, as additional vertical services are incorporated in the switch, in response to customer demand. Additional obsolete equipment in block 2101 is retired. The equipment bays occupied by the retired equipment in block 2101 are now unequipped as a result of the removal of those equipments. Optical switch, OS 2, is deployed to the left of OS 1 in block 2104 during time point 5. Removals continue and new equipment is deployed in those locations that were previously unequipped in block 2101. Obsolete equipment is retired in blocks 2101 and 2102.

Figure 22:
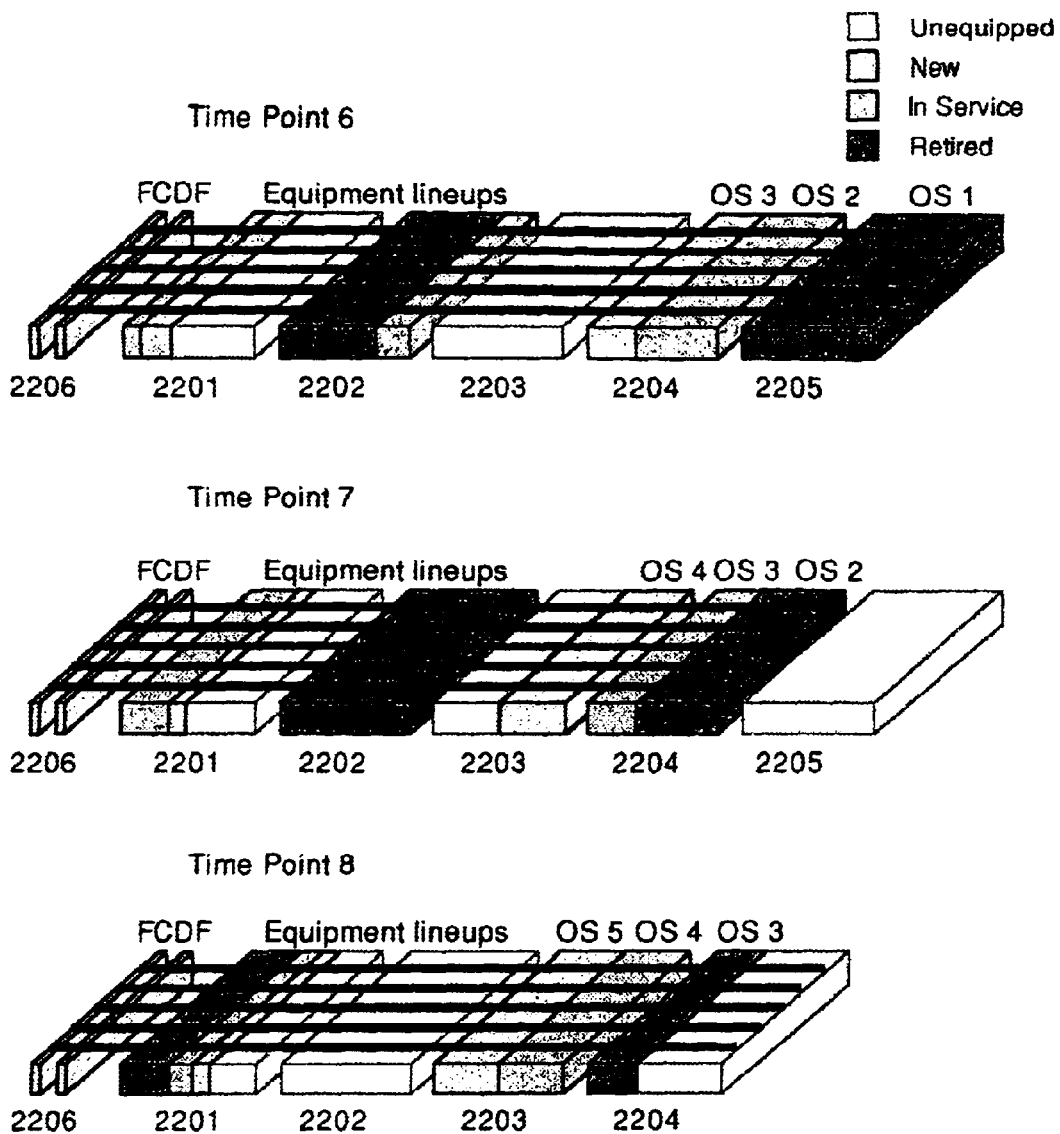
FIGS. 22 illustrates an example of the last three of nine time points in the deployment and evolution of a Fiber Center in accordance with one embodiment of the present invention.

FIG. 22 illustrates an example of the last three of nine time points in the deployment and evolution of a Fiber Center in accordance with one embodiment of the present invention. In time point 6, OS 3 is deployed, in the remainder of block 2204 to replace OS 1, which is then retired. Removals and the deployment of new equipment continues in block 2201. Obsolete equipment is retired in block 2202. Fiber cable from FCDF 2206 to the retired OS 1 is redistributed to the location of the new OS 4 and upgraded. OS 1 is removed from block 2205 and OS 4 is deployed in block 2203 to replace OS 2, which is then retired, in time point 7. Block 2205, which was occupied by OS 1, has been cleared and can be reserved for the deployment of a future optical switch or released for other administrative use as long as there is sufficient space to grow the future OS n from right to left. The progressive reduction of floor space requirements is a direct result of continued miniaturization of the physical equipment as technology advances. OS 2 is removed from block 2204 and OS 5 is deployed in the remaining space in block 2203 to replace OS 3, which is then retired in time point 8. The retired equipment in block 2202 is removed and deployment of new and the retirement of obsolete equipment continues in block 2201. Lineups of optical switch equipment bays can be deployed parallel to the fiber pathways or perpendicular to them. As each successive optical switch is deployed, it is positioned closer to FCDF 2206 than the previous switch, therefore accessing the fiber pathway directly, with no optical switch in the fiber cable path and no need to cable over working equipment.

Figure 23:
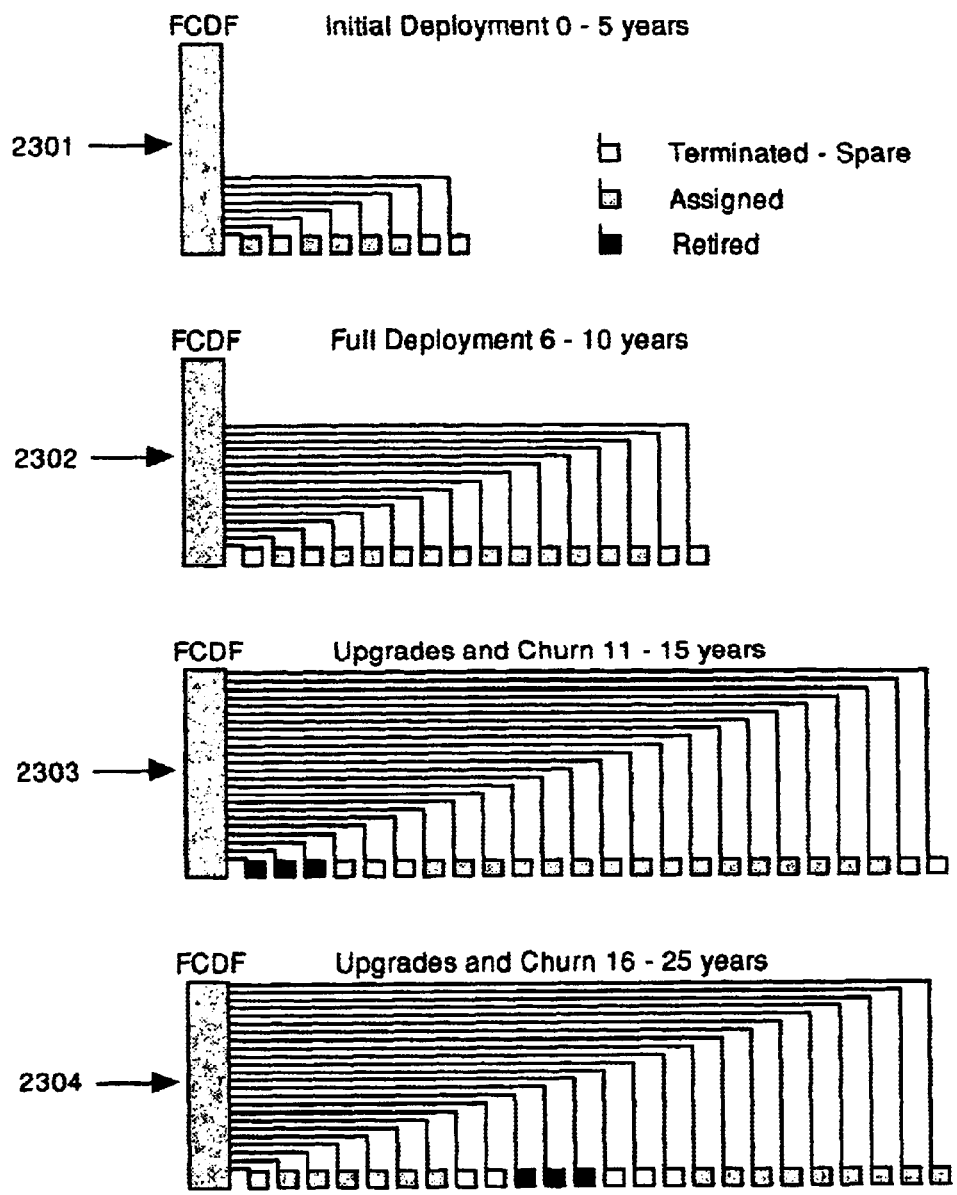
FIG. 23 illustrates an example of the evolution of the equipment cables and equipments in a Fiber Center in accordance with one embodiment of the present invention.

In addition to providing the capacity to manage a floor plan that evolves with future developments, the process and apparatus of the present invention provides the user OTCs with the capacity to manage equipment cables over the life expectancy of each cable. Assume the life expectancy of fiber equipment cable to be 25 years and the life expectancy of central office equipment to be 10 years. All equipment will be installed, assigned, spared, retired and removed in approximately 10 years. The equipment will change out 2.5 times over the life of the fiber cable infrastructure. It can therefore be concluded that the equipment is a plug-in that temporarily occupies a position in the physical fiber infrastructure. Significant amounts of the fiber cable infrastructure can now be managed and reused, rather than abandoned and new fiber cable installed with the equipment representing new technology. In the Fiber Center, the physical fiber infrastructure is installed, managed, used and reused. The fabric of the infrastructure is the physical fiber cable. The Fiber Center is designed to evolve over time in an organized and manageable fashion. The specific goal is to respond to the deployment of OSP cable with the deployment of a complement of groomed equipment cable, to equip that cable and ultimately retire the equipment and re-equip the same cable. This scenario provides the user with the opportunity to change, rearrange or upgrade the connector assemblies during the interval between equipment retirement and the re-equipping of the equipment cable. FIG. 23 illustrates an example of the evolution of the fiber cables in a Fiber Center in accordance with an embodiment of the present invention. FIG. 23 shows one FCDF mod over four time intervals.

Figure 24:
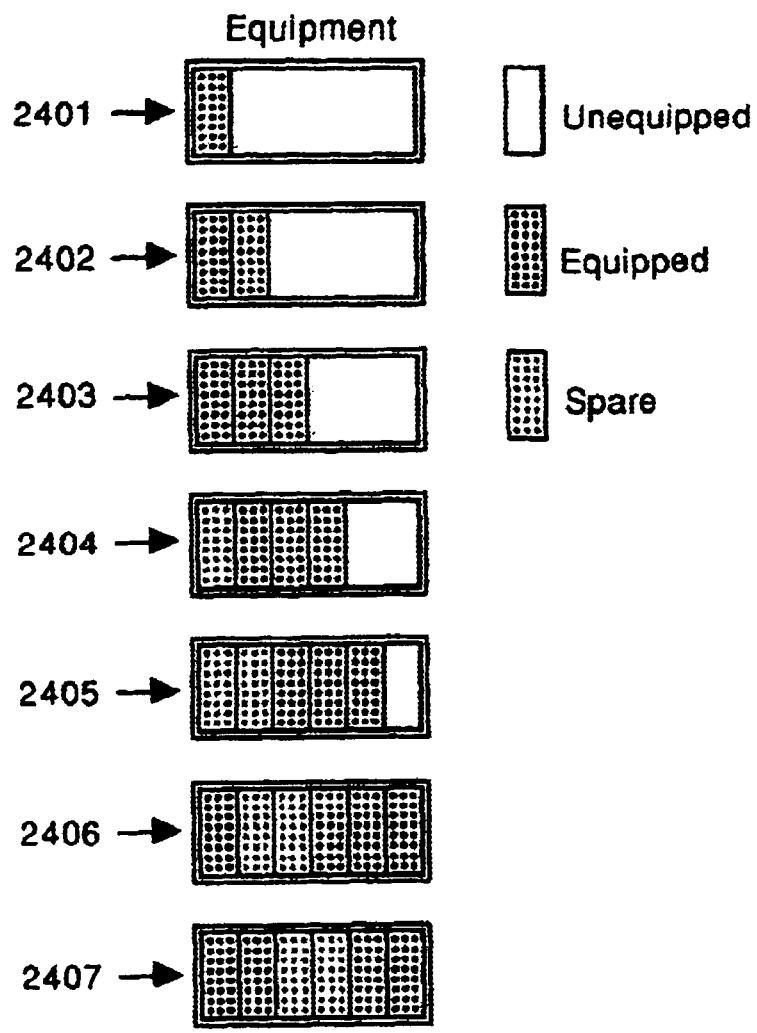
FIG. 24 illustrates an example of the evolution of equipment terminations on an FCDF mod shelf in accordance with one embodiment of the present invention.

Equipment terminations on a specific FCDF mod shelf evolve in a manner similar to the fiber cable evolution described above. FIG. 24 illustrates the evolution of equipment terminations on an FCDF mod shelf in accordance with one embodiment of the invention. FIG. 24 shows one FCDF mod equipment shelf (termination locations) over seven successive time intervals. In FIG. 24, equipment shelf 2401 illustrates the initial deployment of equipment cable on a particular FCDF mod Growth Unit shelf. Equipment shelf 2402 shows continued deployment and equipment shelf 2403 illustrates full deployment. Equipment shelves 2404 and 2405 represent that period of time, either before or at full deployment, when equipment upgrades cause most or all of the initial equipment cables to become spare and when the obsolete equipments can be retired and removed. Equipment shelves 2406 and 2407 illustrate the subsequent re-equipping of the initially deployed equipment cables, the progressive upgrades to new technology which enables the retirement and removal of obsolete equipments on a going forward basis.

Figure 25:
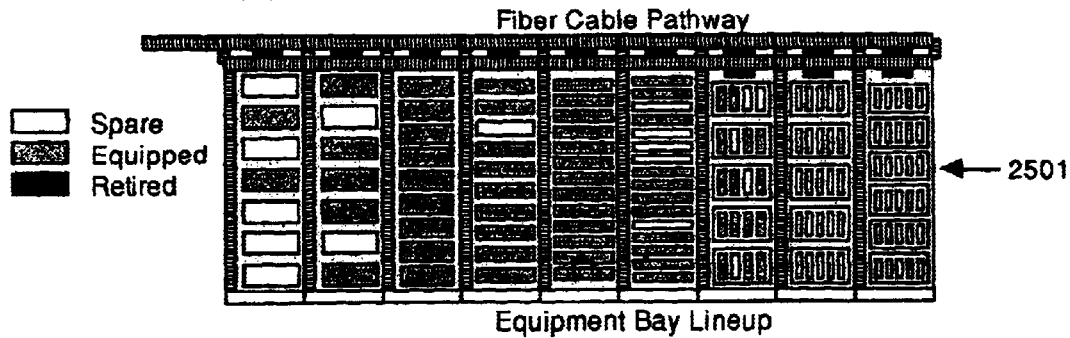
FIG. 25 illustrates an example of the equipment lineup evolution which corresponds to the equipment termination evolution of FIG. 24 in accordance with one embodiment of the present invention.
Figure 25:
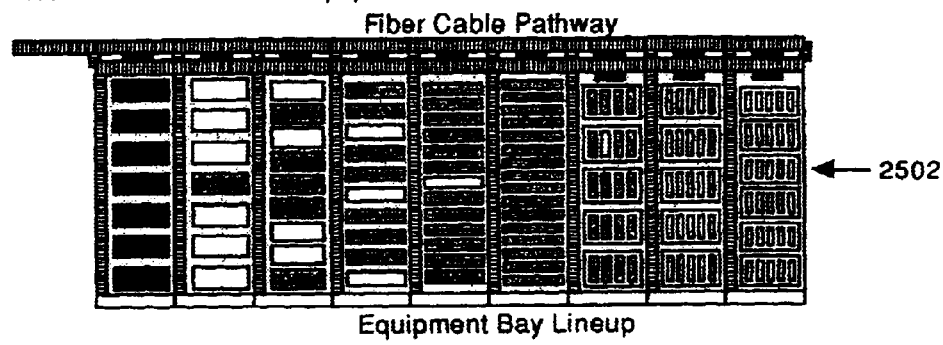
Figure 25:
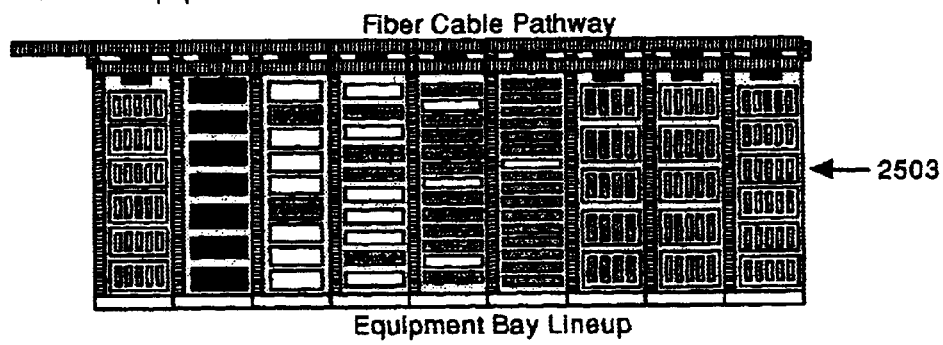

The evolution of equipment terminations described above are related to corresponding changes in central office equipments in an equipment lineup. FIG. 25 illustrates an example of the equipment lineup evolution which corresponds to the equipment shelf evolution in FIG. 24 in accordance with an embodiment of the present invention. FIG. 25 shows three equipment lineups 2501–2503 each composed of 9 equipment bays. Equipment lineup 2501 provides a graphic representation of an equipment lineup which has grown from left to right from initial deployment to some time approaching or at full deployment. The earlier deployed bays show a number of equipment positions that have been equipped and made spare through upgrades to new technology. Equipment lineup 2502 represents the retirement of those obsolete equipments located on a particular bay that have been previously made spare. Equipment lineup 2503 shows the subsequent re-equipping of those equipment locations that have been made available as a result of those retirements. The Fiber Center, in part, mimics a line unit in a digital switch where line cards are plugged in, removed and replaced with those that contain new features and capabilities. The Fiber Center reuses its fiber cable infrastructure in a manner that is similar to that of a digital switch.

In addition, FIG. 25 illustrates the evolution of equipment, in terms of physical size, from seven equipments per bay today, to thirty or more per bay at some time in the not so distant future. The Fiber Center is designed to transition seamlessly from stand alone optical equipment to optical ports of a digital switch and ultimately, to the ports of the future optical switch. The management and administration of fiber optic equipment is addressed in a manner that is comparable to the way digital switches are administered. The physical location of today's stand alone equipments will become the location of the ports of a future optical switch. These locations are a factor of where and when stand alone or switching equipment is placed to access the fiber cable pathway and how the two are separated.

The process and apparatus of the present invention includes a software system which organizes the assembly and management of the Fiber Center in response to customer and management demands. In one embodiment of the invention, the software system accomplishes these goals by building a reference data base for the Fiber Center. The following sections describe an example of a software system in accordance with one embodiment of the present invention.

The reference data base is the record that describes the physical fiber infrastructure from the customer location to the Fiber Center equipment location in an accurate and organized manner. The reference data base is a detailed record of all points of human intervention (for example, connection points; interconnections points; and splice points), all points of physical conversion (for example, OSP cable to tip cable; cable to individual fibers), all multiplex (optical to electrical conversion, OCn/DS3, electrical to electrical conversion, DS3/DS1, DS1/DS0) points and the physical hardware and cabling that links these points. In response to demand, the software system describes the applicable standard components and prefabricated equipment cables, assigns these components to a specific location and enters the resulting description into the reference data base.

An equipment order is generated based on the description and location that resides in the reference data base. The system can easily be interfaced with computer aided design packages to facilitate constructing prints for physical layouts and plot plans of equipment locations. In one embodiment of the invention, the Fiber Center is assembled according to the equipment order and the assembly is verified using the description and location information from the reference data base.

Verification is a sequential process that utilizes a system of bar codes to accomplish positive physical verification of an assembly described in the equipment order. The actual verification is incorporated in the physical assembly process and compares the bar code readings of the assembly to the bar codes in the equipment order. All components, both optical and structural, are physically verified, resulting in a reference data base that is complete and accurate. The sequential process of description, assignment, assembly and verification provides the probability of extremely high data base accuracy.

The reference data base is the foundation for all other data bases to be built upon. In one Fiber Center embodiment, to maintain data base accuracy, downstream data bases (TIRKS, SWITCH, etc.) have read only access to the reference data base. Downstream data bases can define any reference data base component or location in a manner that is different from or in addition to the description in the reference data base; however, downstream data bases cannot alter the component description or location in the reference data base. In one Fiber Center embodiment, a management command (described in greater detail below) permits downstream data base users to access an infrastructure design through an infrastructure management module (described below).

The Infrastructure and Management System is a software control system that determines, orders, coordinates and manages all the physical components necessary to construct, expand and equip the physical fiber infrastructure in an efficient, cost effective and user friendly manner. The software system of the present invention may be implemented by an infrastructure design and management device. The infrastructure design and management device may be located on site or at a remote location. In response to demand, the design and management device defines what is to be assembled, assigns the assembly components to the appropriate locations, establishes the description and locations in the reference data base and creates the equipment order based on the description and assignments.

Figure 26:
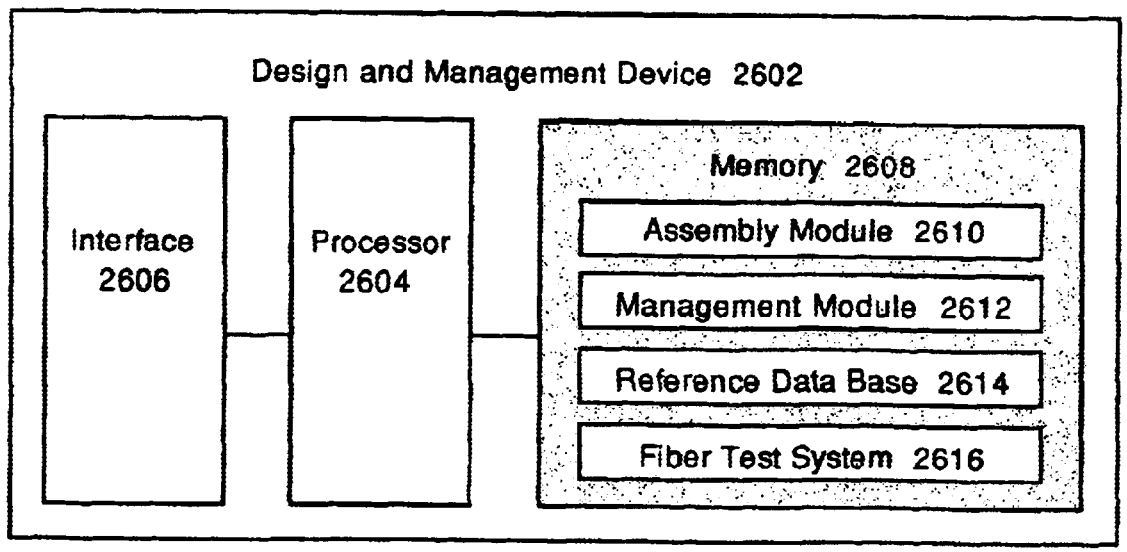
FIG. 26 illustrates an example of a design and management device in accordance with one embodiment of the present invention.

FIG. 26 illustrates an example of a design and management device, in accordance with one embodiment of the present invention. Design and management device 2602 comprises a processor 2604 connected to a computer readable memory 2608 and an interface 2606. Memory 2608 stores computer program code segments which, when executed by the processor 2604, implements the main functionality for this embodiment of the invention. These segments are separated into four modules: 1) an infrastructure assembly module 2610, 2) an infrastructure management module 2612, 3) a reference data base 2514, and 4) a fiber test system 2616. The operation of the modules 2610, 2612, 2614, and 2616 will be discussed in more detail below. Although in this embodiment of the invention, the computer program segments are shown as three separate modules, it can be appreciated that these modules can be further separated into more modules or combined together to form a single module, and still fall within the scope of the invention.

Using a keyboard or similar interface device (not shown), a user sends customer demand information to the assembly module 2610 via interface 2606 and processor 2604. The customer demand information may include services which require a particular type of equipment. Processor 2604 executes computer program segments stored in assembly module 2610 in response to the customer demand information to describe, assign, order, assemble and/or equip fiber spans. Assembly module 2610 also includes price model computer program segments (also executed by processor 2604) which identify the components and labor required to satisfy the demand. In addition, assembly module 2610 includes computer program segments (also executed by processor 2604) which respond to information (described below) received from the management module 2612. Assembly module 2610 stores the design, location, and price information in reference data base 2614. Assembly module 2610 outputs the auto telephone equipment order (T.E.O.) (in conjunction with reference data base 2614 and fiber test system (FTS) 2616) and verifies, monitors and controls the coordination, completion and turn up (put into service) of the assembled and equipped span.

Using a keyboard or similar interface device (not shown), a user sends management information to management module 2612 via interface 2606 and processor 2604. Management information may include automatic retirement of specific types of equipment as they become spare, the automatic removal of retired equipment when all equipments on a specific equipment bay are retired and the upgrade of connector assemblies when all terminations of an equipment cable become spare. Processor 2604 executes computer program segments stored in management module 2612 in response to the management information and issues the necessary engineering work order to assembly module 2610 which completes the required operation. Management module 2612 also responds to various parameters and commands to rearrange, upgrade, turn up, turn down (take out of service), retire and remove equipments and spans as required. Managing the Fiber Center includes all the operations other than those that are triggered directly from customer demand.

The FTS (fiber test system) and communications panel are located on the middle shelf of the equipment bay in each FCDF mod. The specific FTS appearance, when activated for verification and test of a span, identifies itself to the FTS in terms of FCDF mod and Growth Unit. The FTS, in response to the identification, connects a test multiplexer to that FTS appearance. The FTS appearance is activated using a portable assembly device (described below) which contains a copy of the downloaded equipment order description and interacts with the FTS, sequentially, through the verification and test of the component(s) and span(s). The portable assembly device references the equipment order description, which is downloaded from the assembly terminal (described below), records bar code readings at all assembly points, activates the FTS appearance, prepares the test multiplexer for the test of the span and transfers all the bar code readings and test results to the assembly terminal. Identification of the test location and comparison of the test values to the equipment order description and transmission estimate is an integral part of the process by which test and verification is accomplished. The communication panel, in conjunction with the FTS, provides full maintenance and trouble report response capability to fault locate, isolate, test and trouble shoot problems as they occur, minimizing down time. All OSP cable facilities, remote equipment connected to those facilities, equipment cable and associated equipments within the FCDF mod are tested from the FTS appearance in that mod.

Fiber test is accomplished by connecting the equipment cable and the OSP assignments to the FTS appearance, allowing the test multiplexer to compare the actual reflected loss to those expected by the specific span design in the equipment order within a range of deviation. The test multiplexer will enter those readings into the reference data base if they are acceptable. The test set up is verified prior to the actual test of the span and the span is verified again subsequent to the test, when it has been restored to the service condition. The latter verification insures that the span is ready for service and is required for the completion of the equipment order.

The design and management device and at least one assembly device is located in the maintenance area within the Fiber Center, preferably adjacent to the FCDF. The design and management device is the "gatekeeper" in the assembly process. All assembly activities requiring access to the reference data base and the FTS are enabled by the input of an employee or authorized vendor personal identification number (PIN) and equipment order number into the assembly terminal. In response to this input, the design and management device requests and receives the particular equipment order description from the reference data base and downloads a copy of it to the assembly device. The assembly device is a portable, hand held extension of the design and management device equipped with a keypad, liquid crystal display (LCD) screen and a dual bar code reader. The assembly device is a combination tool that records bar codes in pairs (two physically adjacent readings simultaneously) as it is used to plug or unplug fiber optic connectors, mount or remove connectors in the equipment bay connector housing, add FCDF mods and spacers, add or remove standard equipment bays and place or remove prefabricated equipment cable in the FCDF cable ports. The assembly device compares the readings to the downloaded equipment order description and responds to a match with "Assembly Complete/Ready to Test" or to a no match with a prompt to correct the assembly. The equipment order cannot be completed with a no match or no reading. The assembly device references the copy of the equipment order description, records bar code readings at all assembly points, activates the FTS appearance, prepares the test multiplexer for test of a span and transfers all bar code readings and test results to the assembly terminal. Identification of the test location and comparison of the test values to the equipment order description and transmission estimate is an integral part of the process by which verification and test is accomplished.

Figure 27:
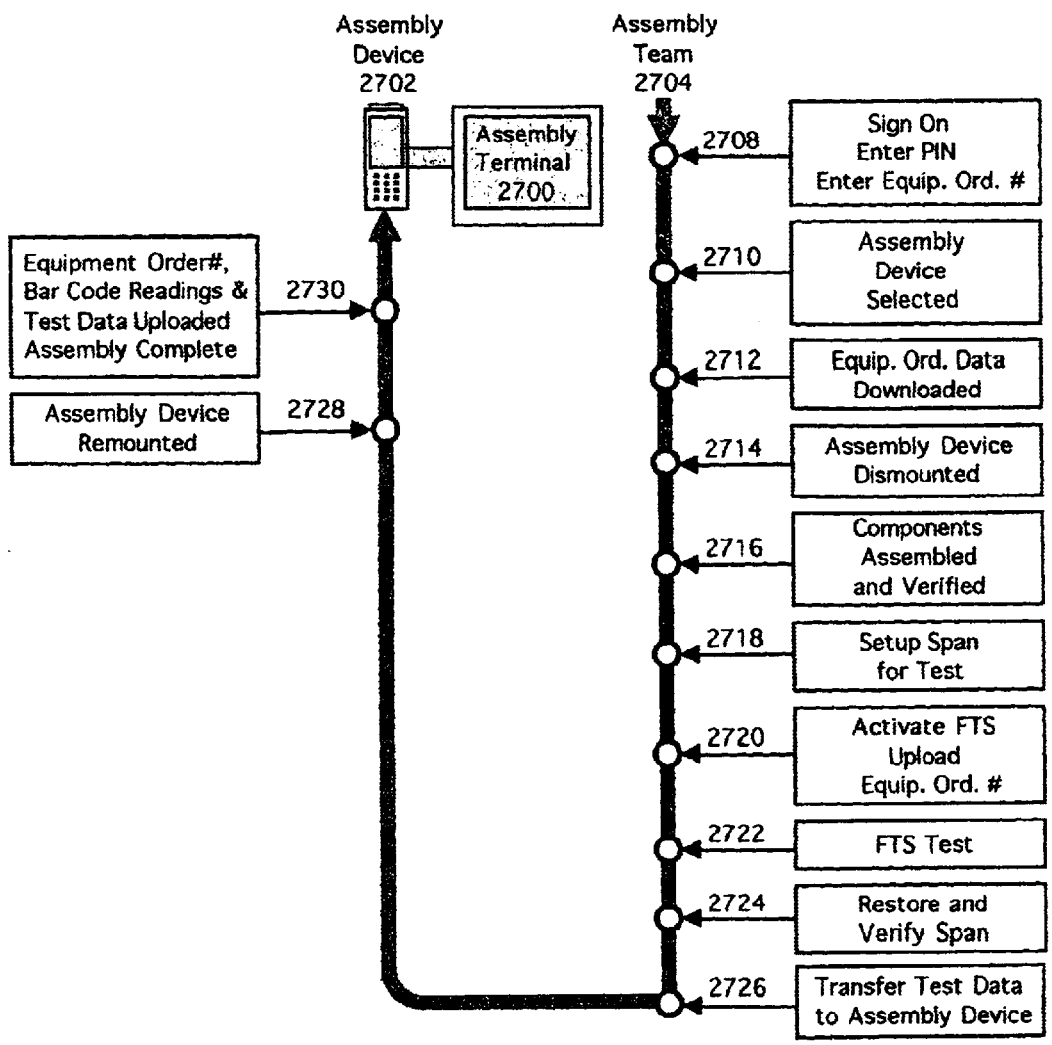
FIG. 27 illustrates a flow chart which includes an example of the steps for using an assembly device with a design and management device in accordance with an embodiment of the invention.

FIG. 27 illustrates a flow chart which includes an example of the steps for using an assembly device with a design and management device in accordance with an embodiment of the invention. The assembler or assembly team (one or more craft persons trained in the assembly procedures) activates the design and management device by entering the PIN and equipment order number. The assembly terminal downloads the equipment order description and selects a portable assembly device for use by the assembly team. A copy of the equipment order description is transferred to the selected assembly device, which is then unlocked and can be dismounted for use by the assembly team. The assembly device is used to assemble and verify the various components required by the equipment order. When the assembly and verification is complete, the fiber span is set up for test at the FTS appearance on the FCDF mod. The assembly device is then plugged into the FTS appearance, activates the test multiplexer and uploads the equipment order description. The FTS performs the tests required in the equipment order description and compares the test results to those expected by the specific span design and if within allowable deviation limits, reflects those results to the reference data base and the assembly device. The assembly team restores and verifies the span to the service condition and returns the assembly device to its mounting at the design and management device location. The mounting of the assembly device automatically uploads the equipment order number, description, bar code readings and verification to the design and management device which transmits the data to the reference data base for completion and reflects that completion to the assembly team.

Although various embodiments are specifically illustrated and described herein, it will be appreciated that modifications and variations of the present invention are covered by the above teachings and within the purview of the appended claims without departing from the spirit and intended scope of the invention.

What is claimed is:

1. A telecommunications fiber optic infrastructure, comprising:
   a fiber center distributing frame which forms a cable interface from at least one remote equipment to at least one central office equipment, said fiber center distributing frame further comprising:
   at least one fiber center distributing frame module having an outside plant portion, an inside plant portion, and an equipment cable port, said at least one remote equipment connecting to said outside plant portion and said at least one central office equipment connecting to said outside plant portion through said equipment cable port, and said outside plant portion being proximately located to said inside plant portion;

said inside plant portion of said fiber center distributing frame module further comprising a plurality of inside mounting positions wherein each one of said plurality of inside mounting positions includes the operating states of equipped, unequipped and spare and is in a designated one of the operating states including: equipped, unequipped and spare; and wherein said connector from said outside plant portion to said inside plant portion is made to any one of said plurality of inside mounting positions which is in said equipped operating state.

2. The telecommunications fiber optic infrastructure of claim 1, wherein said at least one central office equipment is coupled, using interconnect, to said outside plant portion.

3. The telecommunications fiber optic infrastructure of claim 2, further comprising:

a plurality of standard equipment bays, wherein said inside mounting positions are included within said plurality of standard equipment bays.

4. The telecommunications fiber optic infrastructure of claim 3, wherein said plurality of standard equipment bays are aligned in parallel rows substantially perpendicular to said fiber center distributing frame.

5. The telecommunications fiber optic infrastructure of claim 4, wherein two of said parallel rows of standard equipment bays are proximately located to one fiber distributing frame.

6. The telecommunications fiber optic infrastructure of claim 4, wherein two of said parallel rows of standard equipment bays are proximately located to two fiber distributing frames.

7. The telecommunications fiber optic infrastructure of claim 5, further comprising:

a fiber cable pathway connecting said two parallel rows of standard equipment bays to said one fiber distributing frame.

8. The telecommunications fiber optic infrastructure of claim 6, further comprising:

a fiber cable pathway connecting said two parallel rows of standard equipment bays to said two fiber distributing frames.

9. The telecommunications fiber optic infrastructure of claim 3, further comprising:

a standard length connector jumper connecting said at least one central office equipment to an equipment bay connector, said equipment bay connector being proximately located to an equipment bay corresponding to an inside mounting position on which said at least one central office equipment is located; and an equipment cable coupled, using an interconnect, between said equipment bay connector and said outside plant portion.

10. The telecommunications fiber optic infrastructure of claim 9, wherein said equipment cable is deployed along a fiber cable pathway.

11. The telecommunications fiber optic infrastructure of claim 10, wherein said equipment cable comprises:

a standard length first section having a length to reach a farthest connector on said outside plant portion;

a second section having a length which spans a distance from said fiber center distributing frame to an equipment bay benchmark; and a third standard length section having at length which spans from said equipment bay benchmark to said equipment bay connector.

12. The telecommunications fiber optic infrastructure of claim 11, wherein said equipment cable includes at least one reference mark to facilitate deploying said equipment cable along said fiber cable pathway.

13. The telecommunications fiber optic infrastructure of claim 11, wherein said standard length first section further comprises a plurality of spliced standard length fiber jumpers.

14. The telecommunications fiber optic infrastructure of claim 1, wherein a ratio of outside plant portion termination connections to inside plant portion termination connections is less than 1 to 1.

15. The telecommunications fiber optic infrastructure according to claim 1, wherein said connection from said outside plant portion to said inside plant portion is made by interconnection rather than cross-connection.

16. The telecommunication fiber optic infrastructure according to claim 1, wherein a ratio of outside plant portion termination connections to inside plant portion termination connections is 1:2.

17. The telecommunication fiber optic infrastructure according to claim 1, wherein the at least one fiber center distribution frame module include a plurality of fiber center distribution frame shelves arranged so that all equipped fiber span configurations within the plurality of fiber center distribution frame shelves are interconnectable.

18. The telecommunication fiber optic infrastructure according to claim 17, wherein the plurality of fiber center distribution frame shelves are each configured to accommodate 72 fiber spans.

19. The telecommunication fiber optic infrastructure according to claim 17, wherein the plurality of fiber center distribution frame shelves are each configured to accommodate 144 inside plant portion termination connections.

20. The telecommunication fiber optic infrastructure according to claim 17, wherein the fiber span configuration include at least one of a point-to-point span configuration and a ring fiber spans configuration.

* * * * *